United States Patent
Gotoh et al.

(10) Patent No.: US 8,265,345 B2
(45) Date of Patent: Sep. 11, 2012

(54) IMAGE PROCESSING METHOD, IMAGE PROCESSING APPARATUS, IMAGE FORMING APPARATUS, AND IMAGE READING APPARATUS

(75) Inventors: Makio Gotoh, Nara (JP); Masakazu Ohira, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1315 days.

(21) Appl. No.: 11/942,584

(22) Filed: Nov. 19, 2007

(65) Prior Publication Data

US 2008/0118112 A1 May 22, 2008

(30) Foreign Application Priority Data

Nov. 20, 2006 (JP) .................................. 2006-313340
Oct. 26, 2007 (JP) .................................. 2007-279369

(51) Int. Cl.
*G06K 1/00* (2006.01)
*G06K 9/00* (2006.01)
(52) U.S. Cl. .......................... 382/112; 382/219; 358/1.9
(58) Field of Classification Search .................. 382/219, 382/112; 358/1.9
See application file for complete search history.

(56) References Cited

U.S. PATENT DOCUMENTS

| | | | | | |
|---|---|---|---|---|---|
| 5,845,008 | A | * | 12/1998 | Katoh et al. ................... | 382/217 |
| 5,859,935 | A | * | 1/1999 | Johnson et al. ................ | 382/317 |
| 6,940,617 | B2 | * | 9/2005 | Ma et al. ...................... | 358/1.15 |
| 2003/0133156 | A1 | * | 7/2003 | Cragun et al. ................ | 358/1.18 |
| 2005/0154690 | A1 | * | 7/2005 | Nitta et al. ..................... | 706/46 |

FOREIGN PATENT DOCUMENTS

| | | | |
|---|---|---|---|
| JP | 4-150253 | A | 5/1992 |
| JP | 2873220 | B2 | 1/1999 |
| JP | 3028490 | B2 | 2/2000 |
| JP | 2003-319195 | A | 11/2003 |
| JP | 2005-354401 | | * 12/2005 |

OTHER PUBLICATIONS

Nakai, et al. "Document Image Retrieval and Removal of Perspective Distortion Based on Voting for Cross-Ratios", Meeting on Image Recognition and Understanding (2005).

* cited by examiner

*Primary Examiner* — Stephen R Koziol
(74) *Attorney, Agent, or Firm* — Birch, Stewart, Kolasch & Birch, LLP

(57) ABSTRACT

A document matching process section calculates feature points (e.g., the centroid) on the basis of an inputted document image, then selects a plurality of feature points from among the calculated feature points, and then calculates a hash value on the basis of the selected feature points. Then, on the basis of the calculated features, the document matching process section determines whether the document image is similar to a preliminary reference format (reference image). When it is determined as being similar, the document matching process section determines whether write-in is present in the document image, and then outputs a determination signal (a determination result indicating the presence or absence of write-in). In the determination of similarity of the document image, permission or non-permission for processing such as copying is determined more accurately than in the prior art.

10 Claims, 28 Drawing Sheets

F I G. 4

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

FIG. 8
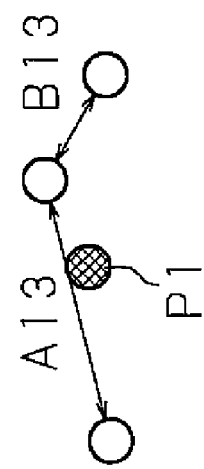
(c) H13
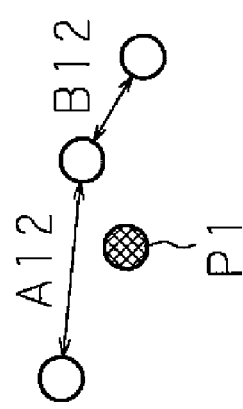
(b) H12
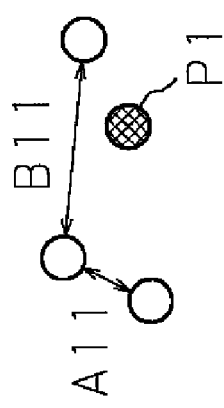
(a) H11

FIG. 10
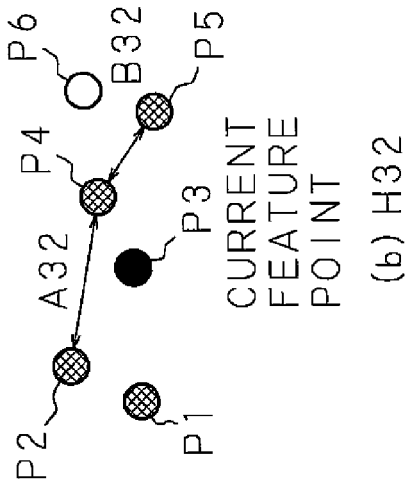
(a) H31
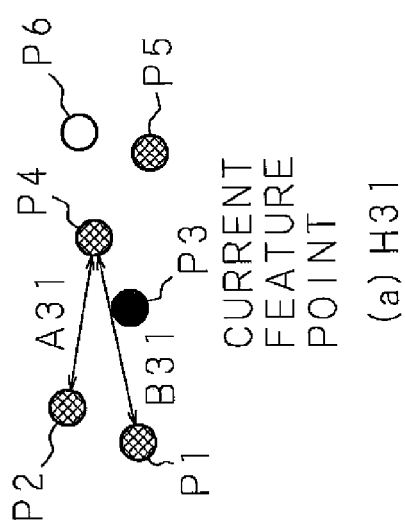
(b) H32
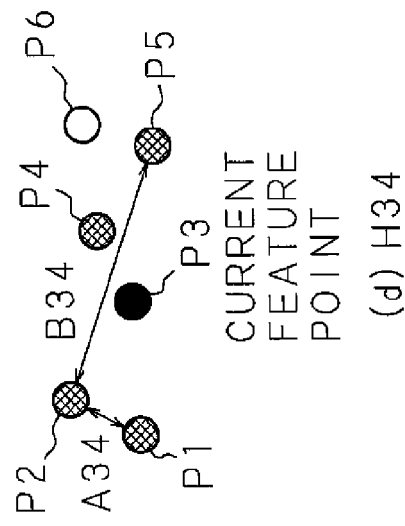
(c) H33
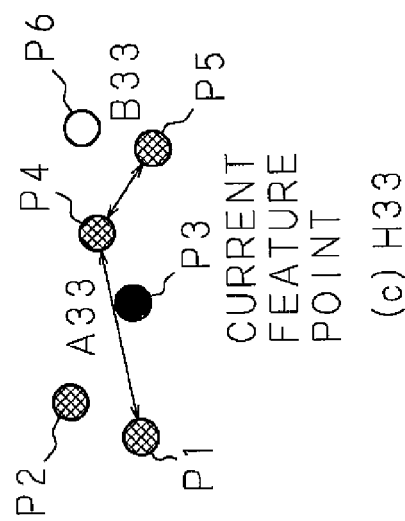
(d) H34

FIG. 12

| INDEX INDICATING FEATURE POINT OF DOCUMENT IMAGE | HASH VALUE | COORDINATES |
|---|---|---|
| p1 | H1 | (x11', y11') |
| p2 | H8 | (x32', y32') |
| p3 | H3 | (x13', y13') |
| p4 | H4 | (x14', y14') |
| p5 | H9 | (x35', y35') |
| p6 | H6 | (x26', y26') |
| p7 | H7 | (x17', y17') |
| ⋮ | ⋮ | ⋮ |

FIG. 13A

| HASH VALUE | INDEX INDICATING DOCUMENT 2262 |
|---|---|
| H1 | ID1, f11 |
| H2 | ID1, f12 |
| H3 | ID1, f13, ID2, f21 |
| H4 | ID1, f14 |
| H5 | ID1, f15 |
| ... | ... |

FIG. 13B

| HASH VALUE | INDEX INDICATING DOCUMENT 2262 |
|---|---|
| H1 | ID1, f11, ID1, f15 |
| H2 | ID1, f12 |
| H3 | ID1, f13, ID2, f21 |
| H4 | ID1, f14 |
| ... | ... |

FIG. 14

| INDEX INDICATING DOCUMENT | INDEX INDICATING FEATURE POINT | COORDINATES |
|---|---|---|
| ID1 | f11 | (x11, y11) |
| | f12 | (x12, y12) |
| | f13 | (x13, y13) |
| | f14 | (x14, y14) |
| | ⋮ | ⋮ |
| ID2 | f21 | (x21, y21) |
| | f22 | (x22, y22) |
| | f23 | (x23, y23) |
| | f24 | (x24, y24) |
| | ⋮ | ⋮ |

| | INDEX INDICATING DOCUMENT | | | | 2264 |
|---|---|---|---|---|---|
| | ID1 | ID2 | ID3 | ID4 | ···IDn |
| fn1 | p1 | | | | |
| fn2 | | | p2 | | |
| fn3 | p3 | | | | |
| fn4 | p4 | | | | |
| fn5 | | | p5 | | |
| fn6 | | p6 | | | |
| fn7 | p7 | | | | |

INDEX INDICATING FEATURE POINT OF REFERENCE FORMAT

FIG. 18A

| DATE | | |
|---|---|---|
| NAME | | |
| ADDRESS | | |
| TEL. NO. | | |
| ENTRY ITEM | | |

FIG. 18B

| DATE | | |
|---|---|---|
| NAME | | |
| ADDRESS | | |
| TEL. NO. | | |
| ENTRY ITEM | | |

| INDEX INDICATING DOCUMENT | ENTRY FIELD | COORDINATES 2265 |
|---|---|---|
| ID1 | NAME | (x11, y11), (x12, y12) |
|  | ADDRESS | (x13, y13), (x14, y14) |
|  | ENTRY ITEM | (x15, y15), (x16, y16) |
| ID2 | ⋯ | (x21, y21), (x22, y22) |
| ID3 | ⋯ | (x31, y31), (x32, y32) |
|  | ⋯ | (x33, y33), (x34, y34) |
| ⋮ | ⋮ | ⋮ |

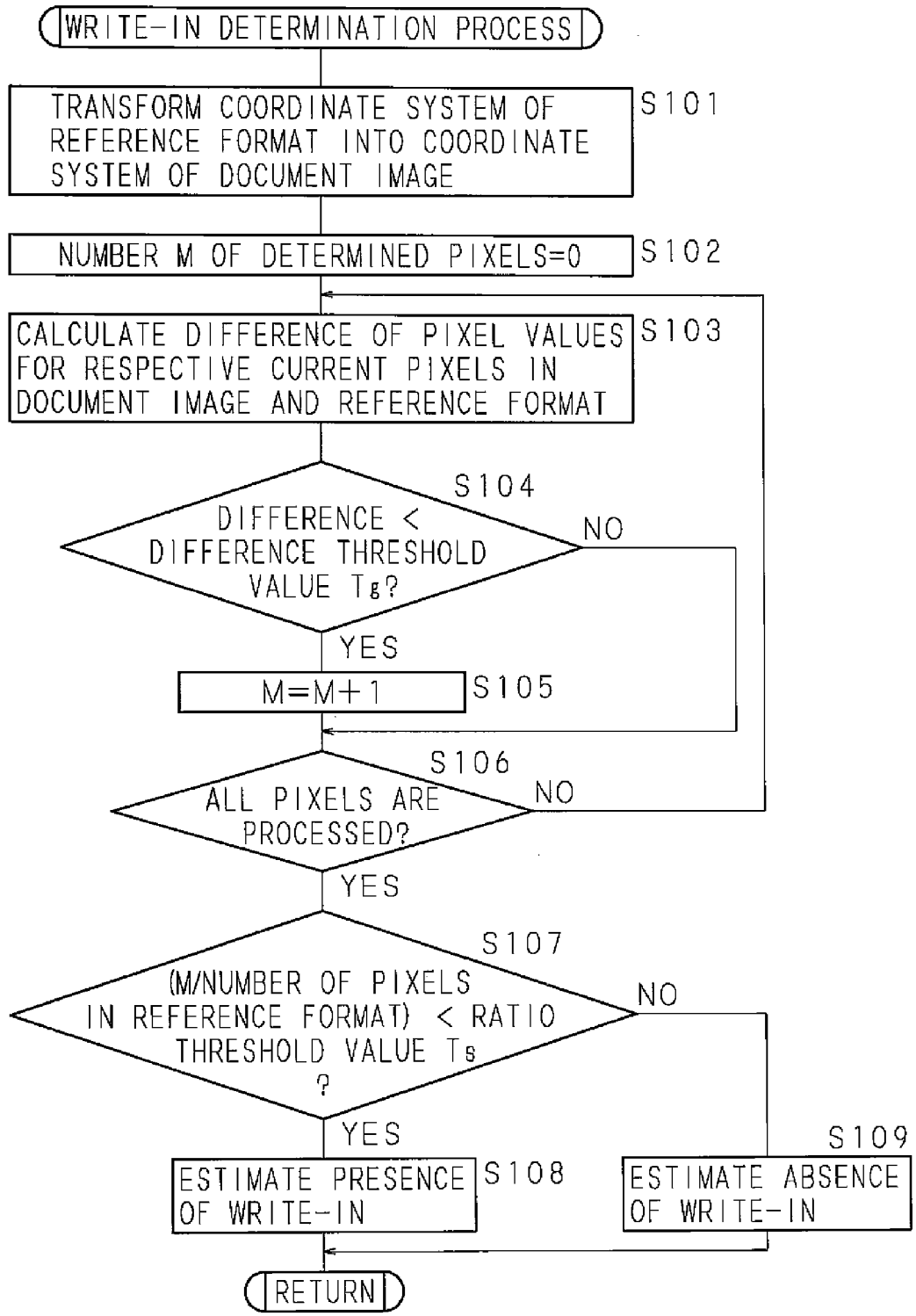

FIG. 22

| SELECTION OPTION | PRESENCE OF WRITE-IN | ABSENCE OF WRITE-IN |
|---|---|---|
| F1 | COPYING OR ELECTRONIC DISTRIBUTION OF DOCUMENT IMAGE IS INHIBITED | COPYING OR ELECTRONIC DISTRIBUTION OF DOCUMENT IMAGE IS PERMITTED |
| F2 | FILLING OF DOCUMENT IMAGE IS PERMITTED | FILLING OF DOCUMENT IMAGE IS INHIBITED |
| F3 | COPYING OR ELECTRONIC DISTRIBUTION OF REFERENCE FORMAT IS PERMITTED | — |
| F4 | COPYING OR ELECTRONIC DISTRIBUTION ONLY FOR REFERENCE FORMAT OR WRITE-IN IN UNIMPORTANT PARTS IS PERMITTED | — |

FIG. 23A
DOCUMENT IMAGE

| DATE | xxxxxx | | |
|---|---|---|---|
| NAME | xxxxxx | xxxxxxxx | xx |
| ADDRESS | xxxxxxxx | xxx xxxx | |
| TEL. NO. | xxxxxx | | |
| ENTRY ITEM | xx xx xx xxxxxxxx xxxxxxxxx xxxxxxxxxx xxxxxx xxxx xx xxxx xxxxxxxxxxx xxxxxx xx xxxxxxxx | | |

FIG. 23B
OUTPUT IMAGE

| DATE | xxxxx | |
| NAME | | |
| ADDRESS | | |
| TEL. NO. | xxxxxx | |
| ENTRY ITEM | | |

IMAGE PROCESSING METHOD, IMAGE PROCESSING APPARATUS, IMAGE FORMING APPARATUS, AND IMAGE READING APPARATUS

CROSS-REFERENCE TO RELATED APPLICATIONS

This Nonprovisional application claims priority under 35 U.S.C. §119(a) on Patent Application No. 2006-313340 filed in Japan on Nov. 20, 2006, and Patent Application No. 2007-279369 filed in Japan on Oct. 26, 2007, the entire contents of which are hereby incorporated by reference.

BACKGROUND OF THE INVENTION

The present invention relates to: an image processing method and an image processing apparatus for performing determination process whether an obtained document image is similar to a preliminary reference image; and an image forming apparatus and an image reading apparatus employing this image processing apparatus.

Proposed methods for reading a document with a scanner and then determining whether the read document image is similar to a preliminary reference image include: a method in which keywords are extracted from an image read by an OCR and then pattern matching is performed on the basis of the extracted keywords; and a method in which documents of determination target are restricted to formatted documents with ruled lines and pattern matching is performed on the basis of information concerning the ruled lines extracted from the read document.

Further, in another method, important documents, confidential documents, and the like are preliminarily stored as reference images. Then, when the read document image is determined as being similar to a reference image, copying of the read document is inhibited so that forgery is prevented and security is improved.

Nevertheless, since a technique of pattern matching is used in the similarity determination, a problem arises that even a document image generated by applying a processing function such as color conversion, scaling, and trimming onto a read document image is undesirably determined as being similar to a reference image so that copying of the document is not permitted.

Thus, a copying apparatus is proposed in which when an inputted image (document image) is determined as an image the image formation (e.g., copying) of which is inhibited, exact formation of the inputted image is inhibited, while when the extent of edit processing performed under the instruction of a user exceeds a predetermined level, the edited inputted image is formed exactly. By virtue of this, even for a document the copying of which is inhibited, copying operation is executed when the copying is performed in a state that various copying functions provided in the copying apparatus are simultaneously utilized so that the result is clearly distinctive from the document (see Japanese Patent Publication No. 3028490).

BRIEF SUMMARY OF THE INVENTION

Nevertheless, in the apparatus of Japanese Patent Publication No. 3028490, when the extent of edit processing exceeds a predetermined level, the copying operation for the document is performed unconditionally. This causes the following problem, for example. That is, despite that copying, electronic distribution, and the like of a document need be inhibited in a case that important matter, personal information, confidential information, or the like is written into the document having a fixed form, the copying and the like of the document is permitted. In particular, in a case that a large amount of write-in is present in the document, the document is recognized at a high probability as being clearly distinctive from the document without write-in, so that the copying is permitted. Thus, accurate determination for the permission or non-permission of copying is desired. Further, when important matter, personal information, confidential information, or the like is written in a document, it is desired to prevent unauthorized copying or leakage of the written important matter, personal information, confidential information, and the like. Further, when a wide variety of documents are present, it is also desired to obtain easily a document that has the same format as a document in which write-in is present already and that is without write-in.

The present invention has been devised in view of such situations. An object of the present invention is to provide: an image processing method and an image processing apparatus in which when an obtained document image is determined as being similar to a preliminary reference image, it is determined whether write-in is present in the obtained document image, and then in accordance with the determination result, output processing for the obtained document image or the reference image is controlled, so that permission or non-permission for processing such as copying can be determined more accurately than in the prior art; and an image forming apparatus and an image reading apparatus employing this image processing apparatus.

Another object of the present invention is to provide: an image processing method and an image processing apparatus in which when it is determined that write-in is present, output of the obtained document image is inhibited, so that unauthorized copying or leakage of important matter, personal information, confidential information, and the like written in the document is prevented; and an image forming apparatus and an image reading apparatus employing this image processing apparatus.

Another object of the present invention is to provide: an image processing method and an image processing apparatus in which when it is determined that write-in is present, output of the write-in in the part in the obtained document image corresponding to one or a plurality of parts defined in advance in the reference image similar to the obtained document image is inhibited, so that unauthorized copying or leakage of confidential information and the like can be prevented in a more detailed manner; and an image forming apparatus and an image reading apparatus employing this image processing apparatus.

Another object of the present invention is to provide: an image processing method and an image processing apparatus in which when it is determined that write-in is present, output of the reference image determined as being similar to the obtained document image is permitted, so that a document that has the same format as a document in which write-in is present already and that is without write-in is obtained easily; and an image forming apparatus and an image reading apparatus employing this image processing apparatus.

Another object of the present invention is to provide: an image processing method and an image processing apparatus in which when it is determined that write-in is present, the obtained document image or a part where write-in is present is recorded, so that when important matter, personal information, confidential information, and the like written in the document leak out, the information can easily be tracked and matched; and an image forming apparatus and an image reading apparatus employing this image processing apparatus.

Another object of the present invention is to provide: an image processing method and an image processing apparatus in which when it is determined that write-in is absent, output of the obtained document image is permitted (output of a document image without high importance is permitted), so that users' convenience is improved; and an image forming apparatus and an image reading apparatus employing this image processing apparatus.

Another object of the present invention is to provide: an image processing method and an image processing apparatus in which the presence or absence of write-in is determined on the basis of an obtained document image having undergone page background removal so that the presence or absence of write-in can be determined more accurately; and an image forming apparatus and an image reading apparatus employing this image processing apparatus.

Another object of the present invention is to provide: an image processing method and an image processing apparatus in which a pixel value of each pixel in a first pixel block containing a current pixel in an obtained document image is calculated on the basis of a pixel value of each pixel in a second pixel block containing the current pixel, then whether the current pixel is an edge pixel is determined on the basis of distribution of the calculated pixel values of the respective pixels in the first pixel block, and then the presence or absence of write-in in the obtained document image is determined on the basis of the number of determined edge pixels, so that the presence or absence of write-in in the obtained document image can be determined with satisfactory accuracy without the necessity of comparison of the pixel values of the obtained document image and the reference image; and an image forming apparatus and an image reading apparatus employing this image processing apparatus.

Another object of the present invention is to provide: an image processing method and an image processing apparatus in which calculation of the pixel value of each pixel in the first pixel block containing the current pixel and determination whether the current pixel is an edge pixel are performed separately for each color component, so that the presence or absence of write-in can be determined more accurately; and an image forming apparatus and an image reading apparatus employing this image processing apparatus.

The image processing apparatus according to the present invention is an image processing apparatus for determining presence or absence of write-in in an obtained document image, comprising: means for determining whether the obtained document image is similar to a preliminary reference image; determining means for, when the obtained document image is determined as being similar to the reference image, determining whether write-in is present in the obtained document image; and controlling means for, in accordance with the determination result of the determining means, controlling output processing for the obtained document image or the reference image.

According to the present invention, when the obtained document image is determined as being similar to a preliminary reference image, it is determined whether write-in is present in the obtained document image. In accordance with the presence or absence (determination result) of write-in, output processing (e.g., copying, electronic distribution, facsimile transmission, and recording) for the obtained document image or the reference image is controlled (e.g., permitted or inhibited). Since it is determined whether write-in is present in the obtained document image, permission or non-permission for processing such as copying can be determined with satisfactory accuracy in comparison with the case that it is merely determined whether the document image and the reference image are similar to each other. Here, in the present invention, the obtained document image indicates: a document image obtained by reading a document image with a scanner; a document image in the form of electronic data generated by write-in necessary information into data of a predetermined format with a computer; and electronic data generated by converting data read with a scanner into a predetermined file format such as JPEG.

In the image processing apparatus according to the present invention, when the determining means determines that write-in is present, the controlling means inhibits output of the obtained document image. According to the present invention, when it is determined that write-in is present in the obtained document image, output (e.g., copying, electronic distribution, facsimile transmission, and recording) of the obtained document image is inhibited. This prevents unauthorized copying or leakage of the written important matter, personal information, confidential information, and the like.

The image processing apparatus according to the present invention further comprises means for defining in advance one or a plurality of parts in the reference image, wherein when the determining means determines that write-in is present, the controlling means inhibits output of the write-in in the part in the obtained document image corresponding to the defined part in the reference image similar to the obtained document image. According to the present invention, when it is determined that write-in is present, output (e.g., copying, electronic distribution, facsimile transmission, and recording) of the write-in in the part in the obtained document image corresponding to one or a plurality of parts defined in advance in the reference image similar to the obtained document image is inhibited. As the part defined in advance, for example, a part where important matter, personal information, confidential information, or the like is to be written in among the entry fields of the document (reference image) having a fixed form is defined in advance depending on the kind of the document. Further, the part can also be defined in advance by user operation. This prevents unauthorized copying or leakage of the part where confidential information or the like is written. Further, the part where non-confidential information or the like is written is outputted intact, so that the user can utilize it.

In the image processing apparatus according to the present invention, when the determining means determines that write-in is present, the controlling means permits output of the reference image determined as being similar to the obtained document image. According to the present invention, when it is determined that write-in is present in the obtained document image, output (e.g., copying, electronic distribution, facsimile transmission, and recording) of the reference image determined as being similar to the obtained document image is permitted. By virtue of this, a document that has the same format as a document in which write-in is present already and that is without write-in is easily obtained from among a wide variety of documents (reference images). In particular, when a large number of mutually different format sheets (formats) are stored, a necessary format can easily be selected out. This improves users' convenience.

The image processing apparatus according to the present invention further comprises recording means for, when the determining means determines that write-in is present, recording the obtained document image or a part where write-in is present. According to the present invention, when it is determined that write-in is present in the obtained document image, the obtained document image or a part where write-in is present is recorded. By virtue of this, when the important matter, personal information, confidential information, and the like written in the document leak out, the information can easily be tracked and matched.

In the image processing apparatus according to the present invention, when the determining means determines that write-in is absent, the controlling means permits output of the obtained document image. According to the present invention, when it is determined that write-in is absent in the obtained document image, output (e.g., copying, electronic distribution, facsimile transmission, and recording) of the obtained document image is permitted. When important matter, personal information, confidential information, or the like is not written in the document, output of the document is permitted (output of a document image without high importance is permitted), so that users' convenience is improved.

The image processing apparatus according to the present invention further comprises page background removing means for removing page background in the obtained document image, wherein the determining means determines whether write-in is present on the basis of the document image in which page background has been removed. According to the present invention, in a preceding stage to the determination whether write-in is present in the obtained document image, page background of the obtained document image is removed. By virtue of this, even in a case that the paper sheet material of the read document is different from that of the reference image like recycled paper and thinly colored paper, the presence or absence of write-in can be determined with satisfactory accuracy.

The image processing apparatus according to the present invention further comprises: pixel value calculating means for calculating a pixel value of each pixel in a first pixel block containing a current pixel in the obtained document image, on the basis of a pixel value of each pixel in a second pixel block containing the current pixel; and edge determining means for determining whether the current pixel is an edge pixel on the basis of distribution of the calculated pixel values of the respective pixels in the first pixel block; wherein the determining means determines whether write-in is present in the obtained document image on the basis of the number of determined edge pixels. According to the present invention, the presence or absence of write-in in the obtained document image is determined on the basis of the number of edge pixels. This permits determination of the presence or absence of write-in in the obtained document image with satisfactory accuracy only on the basis of the obtained document image without the necessity of comparison of the pixel values of the obtained document image and the reference image.

In the image processing apparatus according to the present invention, when the obtained document image is a color image, both the pixel value calculating means and the edge determining means perform processing separately for each color component. According to the present invention, when the obtained document image is a color image, calculation of the pixel value of each pixel in a first pixel block containing a current pixel and determination whether the current pixel is an edge pixel are performed separately for each color component. This suppresses the influence of isolated points in the obtained document image and noise at the time of reading and the influence of dirt in the base sheet of the document or dust adhering to the base sheet. Accordingly, determination accuracy for the presence or absence of write-in is improved further.

The image forming apparatus according to the present invention comprises: any one of the image processing apparatuses described above; and image forming means for forming an output image on the basis of the image processed by the image processing apparatus.

The image reading apparatus according to the present invention comprises: image reading means for reading a document image; and any one of the image processing apparatuses described above; wherein the document image read by the image reading means is processed by the image processing apparatus.

The computer program according to the present invention is a computer program for causing a computer to determine presence or absence of write-in in an obtained document image, and serves as: means for causing the computer to determine whether the obtained document image is similar to a preliminary reference image; and means for causing the computer to determine whether write-in is present in the obtained document image having been determined as being similar.

The computer-readable memory product according to the present invention stores the computer program described above.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanation diagram showing an example of a filter coefficient of a filtering section;

FIG. 8 is an explanatory diagram showing an example of calculation of an invariant with respect to a current feature point;

FIG. 10 is an explanatory diagram showing another example of calculation of an invariant with respect to a current feature point;

FIG. 12 is an explanation diagram showing a structure of a feature point coordinate table for a document image;

FIGS. 13A and 13B are explanatory diagrams showing a structure of a hash table for a reference format;

FIG. 14 is an explanation diagram showing a structure of a feature point coordinate table for a reference format;

FIG. 15 is an explanation diagram showing a structure of a feature point vote table;

FIGS. 18A and 18B are explanatory diagrams showing an example of a reference format;

FIG. 21 is a flow chart showing a procedure of write-in determination process;

FIG. 22 is an explanation diagram showing an example of control of output process;

FIGS. 23A and 23B are explanatory diagrams showing an example output of a document image;

DETAILED DESCRIPTION OF THE INVENTION

The present invention is described below with reference to the drawings illustrating its embodiments.

Embodiment 1

Figure 1:
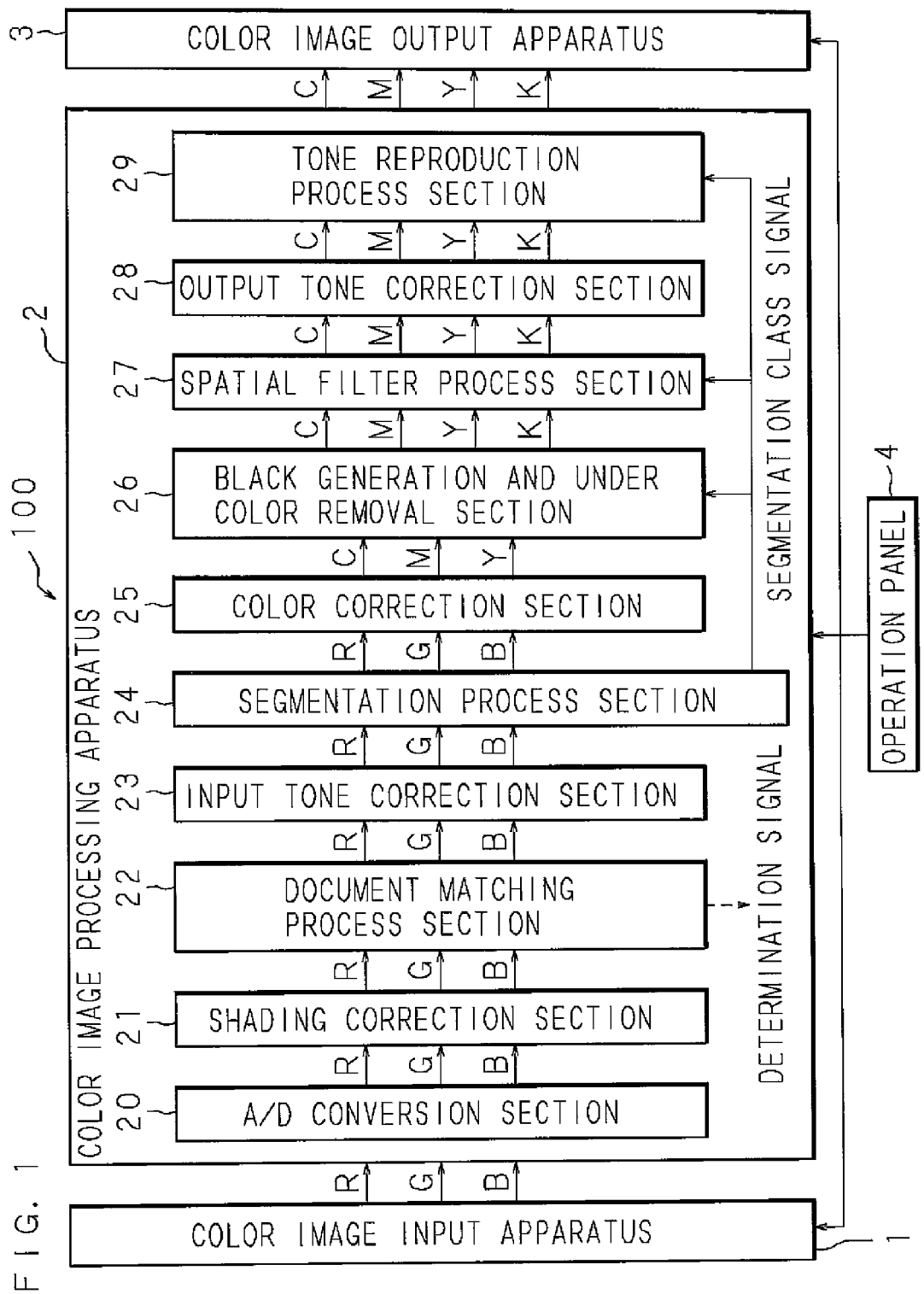
FIG. 1 is a block diagram showing a configuration of an image forming apparatus employing an image processing apparatus according to the present invention.

FIG. 1 is a block diagram showing the configuration of an image forming apparatus 100 employing an image processing apparatus according to the present invention. The image forming apparatus 100 (e.g., a digital color copying machine or a multi-function peripheral provided with combined functions such as a printer function and a facsimile and e-mail distribution function) includes a color image input apparatus 1, a color image processing apparatus 2 (an image processing apparatus), a color image output apparatus 3 serving as an image forming apparatus, and an operation panel 4 for various kinds of operation. Image data of analog signals of RGB (R: red, G: green, B: blue) obtained when the color image input apparatus 1 reads a document is outputted to the color image processing apparatus 2, then processed by predetermined processing in the color image processing apparatus 2, and then outputted to the color image output apparatus 3 as digital color signals of CMYK (C: cyan, M: magenta, Y: yellow, K: black).

The color image input apparatus 1 is, for example, a scanner provided with a CCD (Charged Coupled Device). The color image input apparatus 1 reads a reflected light image from the document image in the form of analog signals of RGB, and then outputs the read RGB signals to the color image processing apparatus 2. Further, the color image output apparatus 3 is an image forming apparatus employing an electrophotography method or an inkjet method for outputting the image data of the document image onto a record paper sheet. Further, the color image output apparatus 3 may be a display unit such as a display.

The color image processing apparatus 2 is constructed from a CPU, an ASIC (Application Specific Integrated Circuit), and the like. An A/D conversion section 20 converts the RGB signals inputted from the color image input apparatus 1 into, for example, 10-bit digital signals, and then outputs the converted RGB signals to a shading correction section 21.

The shading correction section 21 performs correction processing in which various kinds of distortion generated in the illumination system, the image focusing system, and the image sensing system of the color image input apparatus 1 is removed from the inputted RGB signals. Further, the shading correction section 21 performs the processing of adjusting the color balance on the inputted RGB signals (RGB reflectivity signals) and performs the processing of converting the signals into those such as a density (pixel value) signal easily treated by the image processing system adopted in the color image processing apparatus 2, and then outputs the converted RGB signals (image) to a document matching process section 22.

The document matching process section 22 binarizes the inputted image, then calculates feature points (e.g., the centroid) of a connected component specified on the basis of the binary image, then selects a plurality of feature points from among the calculated feature points, then obtains an invariant on the basis of the selected feature points, and then calculates features (feature vector e.g., a hash value) on the basis of the invariant. Then, on the basis of the calculated features, the document matching process section 22 determines whether the input image (document image) is similar to a preliminary reference format (reference image). When it is determined as being similar, the document matching process section 22 determines whether write-in is present in the input image (document image), and then outputs a determination signal (a determination result indicating the presence or absence of write-in). Further, the document matching process section 22 outputs the inputted RGB signals intact to an input tone correction section 23 of the subsequent stage.

Here, in the present specification, "write-in" indicates, for example, (1) what is written in with a pencil, a pen, or the like into a fixed format such as a sheet format, (2) what is generated by inputting data into a predetermined entry through a computer system or the like and then outputting the filled entry through a printer or the like into a paper sheet in which a format is printed, and (3) what is generated by inputting a text or the like into an electronic format of a fixed form through a computer system or the like and then outputting it through a printer or the like. And, in the present invention, the document image indicates: a document image obtained by reading a document image with a scanner; a document image in the form of electronic data generated by write-in necessary information into data of a predetermined format with a computer; electronic data generated by converting data read with a scanner into a predetermined file format such as JPEG; and the like.

The input tone correction section 23 performs image quality adjustment processing such as page background density removing or contrast, and then outputs the processed RGB signals to a segmentation process section 24. On the basis of the inputted RGB signals, the segmentation process section 24 separates respective pixels of the inputted image into a text component, a halftone component, and a photograph component (a continuous tone component). On the basis of the segmentation result, the segmentation process section 24 outputs a segmentation class signal indicating that each pixel belongs to which segment, to a black generation and under color removal section 26, a spatial filter process section 27, and a tone reproduction process section 29. Further, the segmentation process section 24 outputs the inputted RGB signals intact to a color correction section 25 of the subsequent stage. The color correction section 25 converts the inputted RGB signals into the color space of CMY, then performs color correction in accordance with the characteristics of the color image output apparatus 3, and then outputs the corrected CMY signals to the black generation and under color removal section 26. Specifically, for the purpose of high fidelity in color reproduction, the color correction section 25 performs the processing of removing color impurity on the basis of the spectral characteristics of the CMY color materials containing unnecessary absorption components.

On the basis of the CMY signals inputted from the color correction section 25, the black generation and under color removal section 26 generates a K (black) signal and, at the same time, subtracts the K signal from the inputted CMY signals so as to generate new CMY signals, and then outputs the generated CMYK signals to the spatial filter process section 27. An example of processing in the black generation and under color removal section 26 is described below. For example, in the case of processing of black generation by using skeleton black, the input-output characteristics of the skeleton curve is expressed by y=f(x), input data is denoted by C, M, and Y, output data is denoted by C', M', Y', and K', and the UCR (Under Color Removal ratio is denoted by $\alpha$ (0<$\alpha$<1). Then, data outputted in the black generation and under color removal process is expressed by K'=f{min(C,M,Y)}, C'=C−$\alpha$K', M'=M−$\alpha$K', and Y'=Y−$\alpha$K'.

The spatial filter process section 27 performs spatial filtering by means of a digital filter based on the segmentation class signal, onto the CMYK signals inputted from the black generation and under color removal section 26. By virtue of this, the spatial frequency characteristics of the image data is corrected so that blur occurrence or graininess degradation is prevented in the output image in the color image output apparatus 3. For example, in order to improve the reproducibility of, especially, black characters (texts) or color characters, the spatial filter process section 27 performs edge enhancement processing so as to emphasize high frequency components for the segment separated into a text component by the segmentation process section 24. Further, the spatial filter process section 27 performs low pass filtering for removing the input halftone components, onto the segment separated into a halftone component by the segmentation process section 24. The spatial filter process section 27 outputs the processed CMYK signals to the output tone correction section 28. The output tone correction section 28 performs output tone correction process of converting the CMYK signals inputted from the spatial filter process section 27 into a halftone screen area ratio which is a characteristic value of the color image output apparatus 3. Then, the output tone correction section 28 outputs the CMYK signals having undergone the output tone correction process to the tone reproduction process section 29.

On the basis of the segmentation class signal inputted from the segmentation process section 24, the tone reproduction process section 29 performs predetermined processing on the CMYK signals inputted from the output tone correction section 28. For example, in order to improve the reproducibility of, especially, black characters or color characters, the tone reproduction process section 29 performs binarization process or multi-level dithering process on the segment separated into a text component, such that the signals should become appropriate for the reproduction of high frequency components in the color image output apparatus 3. Further, the tone reproduction process section 29 performs tone reproduction process (halftone generation) on the segment separated into a halftone component by the segmentation process section 24, such that the image is finally separated into pixels so that each tone can be reproduced. Further, the tone reproduction process section 29 performs binarization processing or multi-level dithering processing on the segment separated into a photograph component by the segmentation process section 24, such that the signals should become appropriate for the tone reproduction in the color image output apparatus 3.

The color image processing apparatus 2 temporarily stores into a storage section (not shown) the image data (CMYK signals) processed by the tone reproduction process section 29. Then, in a predetermined timing of performing image formation, the color image processing apparatus 2 reads the image data stored in the storage section, and then outputs the read image data to the color image output apparatus 3. Control for these is performed, for example, by a CPU (not shown). Further, on the basis of the determination signal outputted from the document matching process section 22, the CPU (not shown) in the color image processing apparatus 2 controls output processing (e.g., copying, electronic distribution, facsimile transmission, and recording) for the document image.

Figure 2:
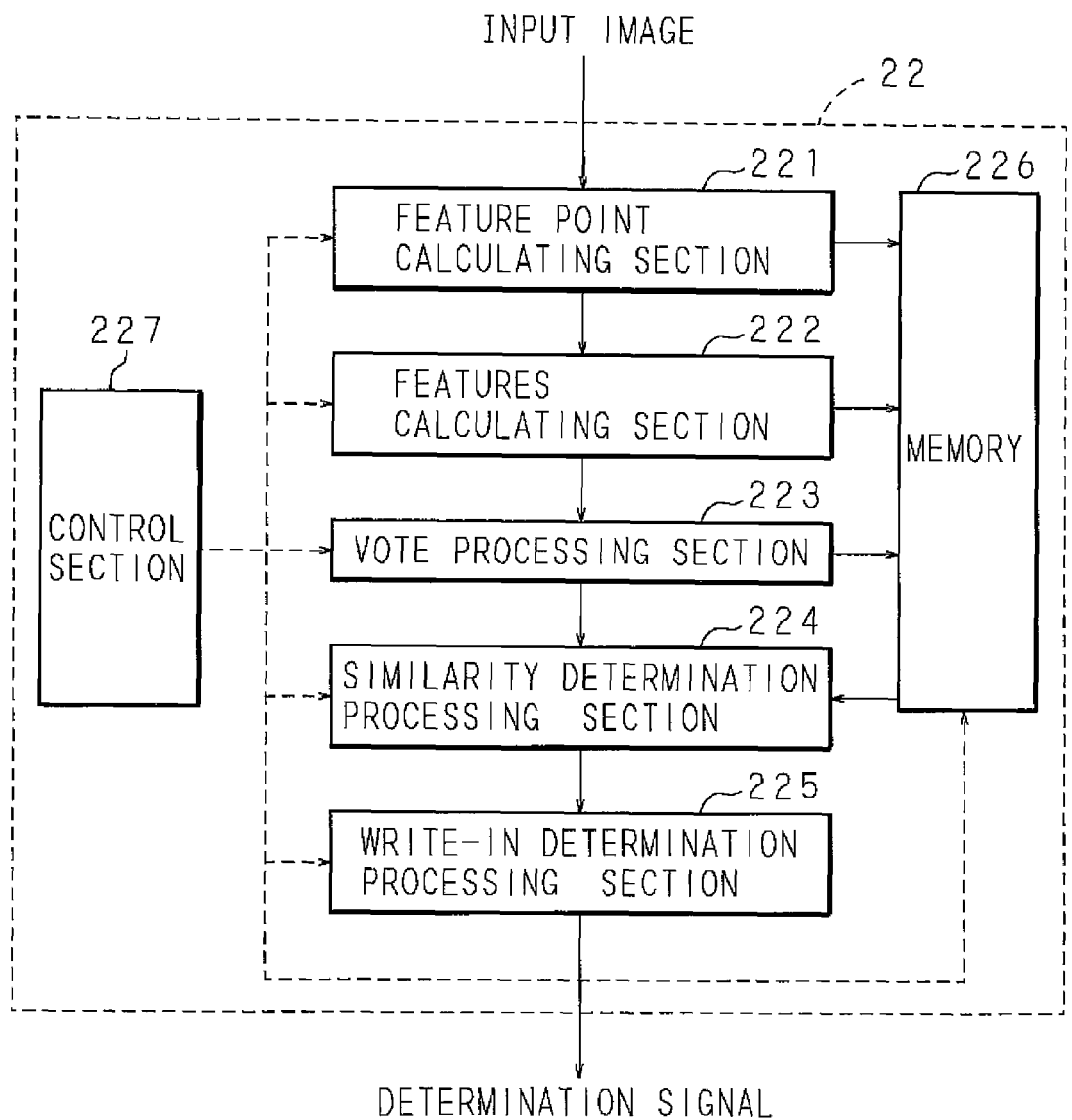
FIG. 2 is a block diagram showing a configuration of a document matching process section.

FIG. 2 is a block diagram showing the configuration of the document matching process section 22. The document matching process section 22 includes a feature point calculating section 221, a features calculating section 222, a vote processing section 223, a similarity determination processing section 224, a write-in determination processing section 225, a memory 226, and a control section 227 for controlling these sections.

The feature point calculating section 221 performs later-described predetermined processing on the inputted image (document image) and, at the same time, extracts a connected component of character strings or ruled lines in the inputted image so as to calculate a feature point (e.g., the centroid) of the connected component. More specifically, the feature point calculating section 221 binarizes the inputted image, extracts (calculates) a feature point (e.g., a value obtained by accumulating the coordinate values of the respective pixels constituting a connected component in the binary image and by dividing the accumulated coordinate values with the number of pixels contained in the connected component) of the connected component specified on the basis of the binary image, and then outputs the extracted feature point to the features calculating section 222.

Figure 3:
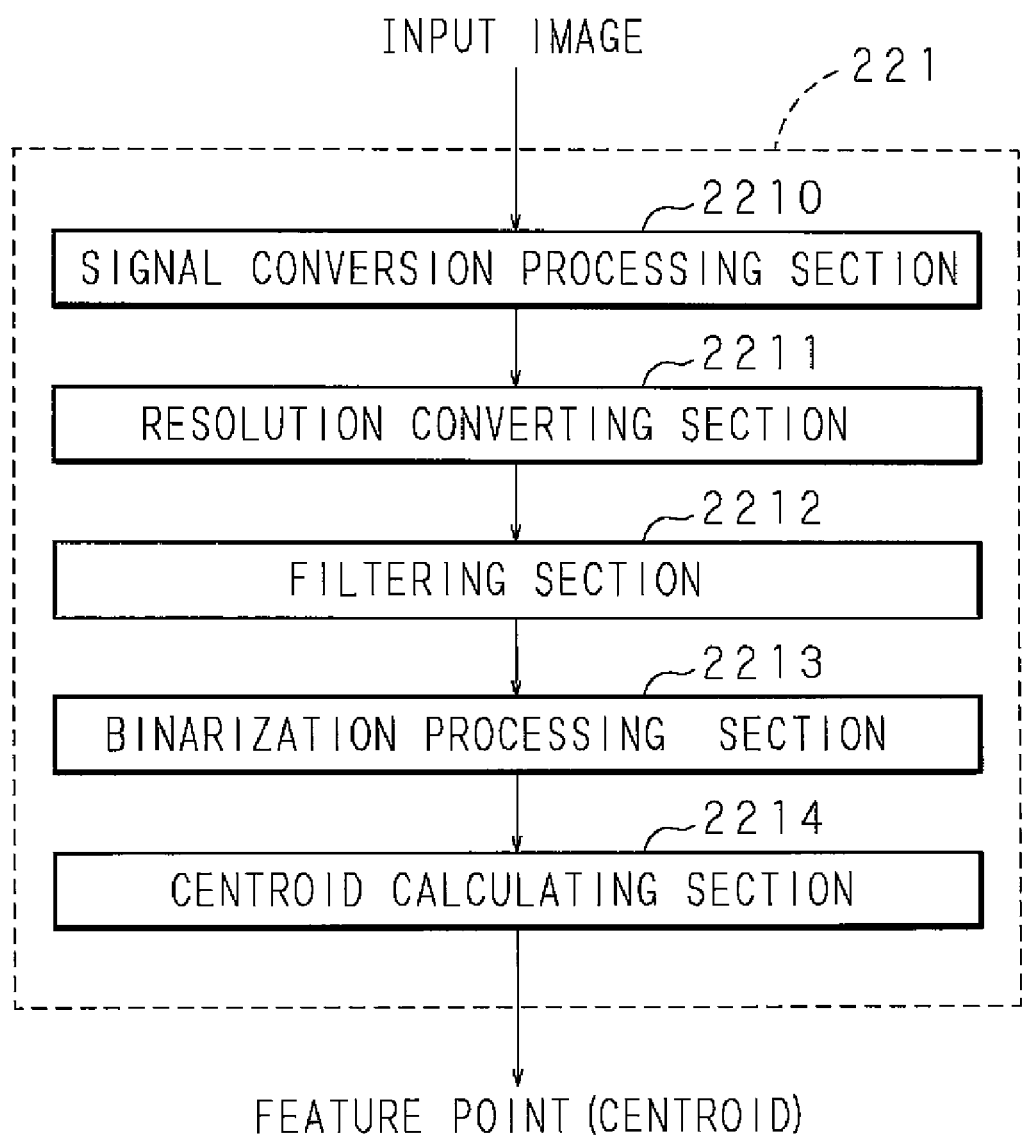
FIG. 3 is a block diagram showing a configuration of a feature point calculating section.

FIG. 3 is a block diagram showing the configuration of the feature point calculating section 221. The feature point calculating section 221 includes a signal conversion processing section 2210, a resolution converting section 2211, a filtering section 2212, a binarization processing section 2213, and a centroid calculating section 2214.

When the inputted image is a color image, the signal conversion processing section 2210 achromatizes and converts the color image into a luminance signal or a lightness signal, and then outputs the converted image to the resolution converting section 2211. For example, when the color components RGB of each pixel is denoted respectively by $Rj$, $Gj$, and $Bj$, the luminance signal $Yj$ is expressed by $Yj=0.30\times Rj+0.59\times Gj+0.11\times Bj$. Here, the present invention is not limited to this formula. That is, the RGB signals may be converted into CIE1976 L*a*b* signals.

Even when the inputted image is one having undergone optical magnification change in the color image input apparatus 1, the resolution converting section 2211 performs magnification change on the inputted image again such as to realize a predetermined resolution, and then outputs to the filtering section 2212 the image having undergone the magnification change. By virtue of this, even when magnification change processing has been performed by the color image input apparatus 1 so that the resolution has varied, extraction of a feature point is achieved free from its influence. This permits accurate classification of the document. In particular, in the case of size-reduced characters, a possibility is avoided that when a connected component is to be specified by binarization processing, blotted characters cause intrinsically separated regions to be specified as if they are connected to each other so that the calculated centroid may deviate. Further, the resolution converting section 2211 converts the image into that of a resolution smaller than the resolution obtained when the image is read by the color image input apparatus 1 with unity magnification. For example, an image read at 600 dpi (dot per inch) by the color image input apparatus 1 is converted into that of 300 dpi. This reduces the amount of processing in the subsequent stage.

The filtering section 2212 corrects the spatial frequency characteristics of the inputted image (e.g., enhancement processing and smoothing of the image), and then outputs the corrected image to the binarization processing section 2213. Since the spatial frequency characteristics of the color image input apparatus 1 is different depending on each model, the filtering section 2212 corrects the different spatial frequency characteristics into required characteristics. In the image (e.g., image signal) outputted from the color image input apparatus 1, degradation such as blurring in the image is caused by, for example: optical system components such as lenses and mirrors; the aperture ratio, the transfer efficiency, and the after-image of the light acceptance surface of CCD; and the storage effect and the scanning unevenness caused by the physical scan. The filtering section 2212 performs enhancement processing on the boundary or the edges so as to restore degradation such as blurring generated in the image. Further, the filtering section 2212 performs smoothing for suppressing high frequency components which are unnecessary in the feature point extracting processing performed in the subsequent stage. This permits accurate extraction of a feature point, and hence achieves accurate determination of the similarity of the image. Here, the filter coefficient used in the filtering section 2212 may be set up appropriately in accordance with the model, the characteristics, or the like of the employed color image input apparatus 1.

FIG. 4 is an explanation diagram showing an example of the filter coefficient of the filtering section 2212. As shown in the figure, the spatial filter is, for example, a mixing filter that has a size of 7×7 (seven rows by seven columns) and that performs enhancement processing and smoothing processing. The pixels of the inputted image are scanned so that arithmetic processing by the spatial filter is performed on all the pixels. Here, the size of the spatial filter is not limited to the size of 7×7. That is, the size may be 3×3, 5×5, or the like. Further, the numerical value of the filter coefficient is an example. That is, the actual value is not limited to this example, and may be set up appropriately in accordance with the model, the characteristics, or the like of the employed color image input apparatus 1.

The binarization processing section 2213 compares with a threshold value the luminance value (the luminance signal) or the lightness value (the lightness signal) of the inputted image so as to binarize the image, and then outputs to the centroid calculating section 2214 the binary image having undergone the binarization. On the basis of the binarization information (e.g., expressed by "1" and "0") of each pixel of the binary image inputted from the binarization processing section 2213, the centroid calculating section 2214 performs labeling (label attaching processing) on each pixel. Then, the centroid calculating section 2214 specifies a connected component where pixels having the same label are in succession, then extracts as a feature point the centroid of the specified connected component, and then outputs the extracted feature point to the features calculating section 222. Here, the feature point is expressed by the coordinates (x',y') in the binary image (document image).

Figure 5:
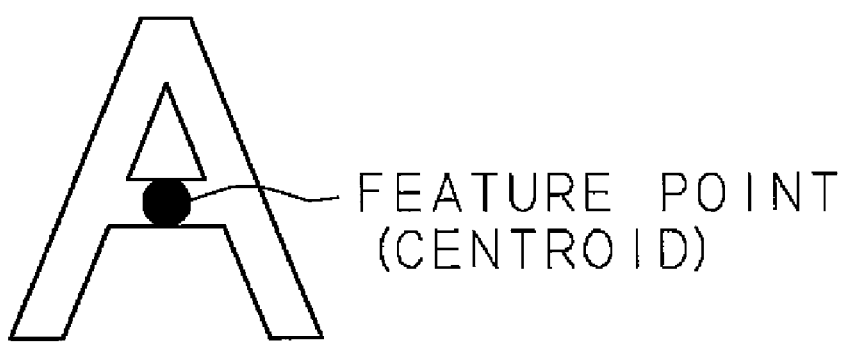
FIG. 5 is an explanation diagram showing an example of a feature point of a connected component.
Figure 6:
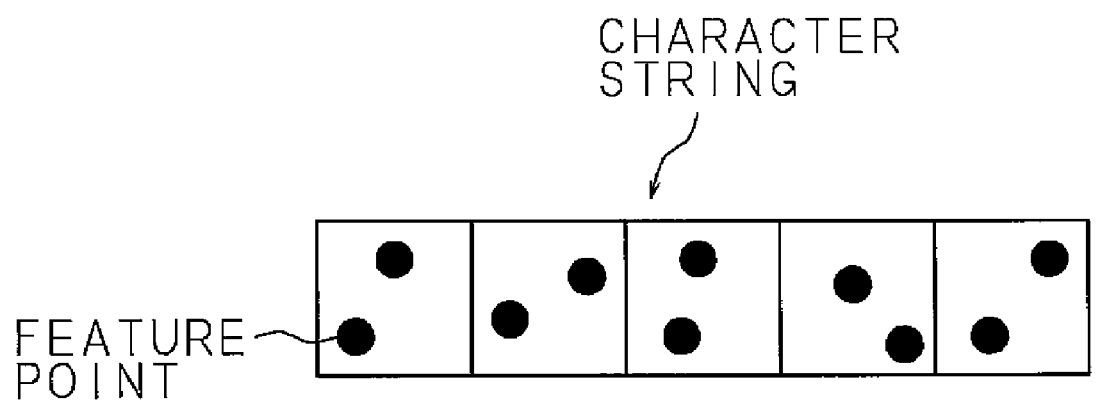
FIG. 6 is an explanation diagram showing an example of a result of extraction of a feature point for a character string.

FIG. 5 is an explanation diagram showing an example of a feature point of a connected component. In the figure, the specified connected component is a character "A", and is specified as a set of pixels to which the same label is imparted. A feature point (centroid) of this character "A" is located at a position (x'-coordinate, y'-coordinate) indicated by a black dot in the figure. FIG. 6 is an explanation diagram showing an example of a result of extraction of a feature point for a character string. In the case of a character string composed of a plurality of characters, a plurality of feature points are extracted that have different coordinates depending on the kinds of characters.

Using the feature point inputted from the feature point calculating section 221, the features calculating section 222 calculates an invariant with respect to the processing of rotation, expansion, size-reduction, or the like, and then calculates features (e.g., a hash value) on the basis of this invariant. More specifically, the features calculating section 222 adopts, as a current feature point, each feature point (that is, coordinate values of the centroid of the connected component) inputted from the feature point calculating section 221, and then extracts, for example, surrounding four feature points having smaller distances from the current feature point.

Figure 7:
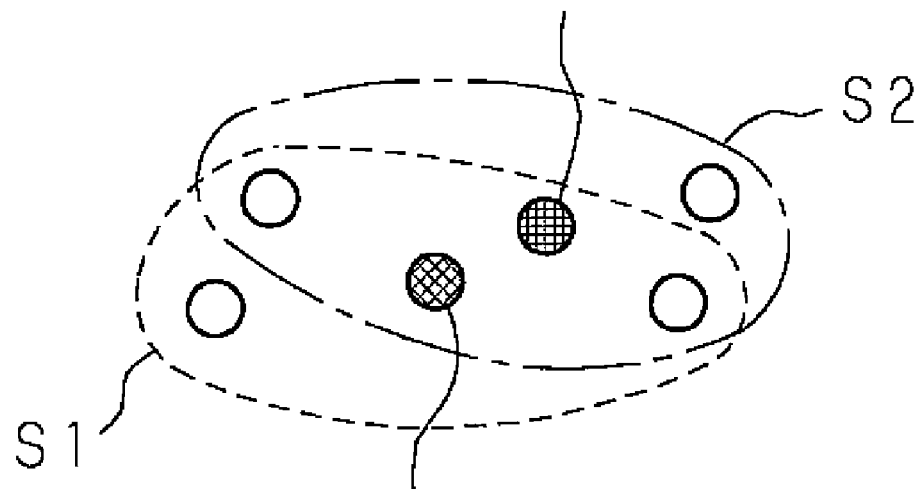
FIG. 7 is an explanation diagram showing the current feature point and the surrounding feature point.

FIG. 7 is an explanation diagram showing current feature points and surrounding feature points. As shown in the figure, for example, four feature points surrounded by a closed curve S1 are extracted for a current feature point P1 in the order that the distance from the current feature point P1 is small (for the current feature point P1, a current feature point P2 also is extracted as one feature point). Further, for the current feature point P2, for example, four feature points surrounded by a closed curve S2 are extracted in the order that the distance from the current feature point P2 is small, as the same described (for the current feature point P2, the current feature point P1 also is extracted as one feature point).

The features calculating section 222 selects three feature points from the four extracted feature points so as to calculate an invariant. Here, the number of selected feature points is not limited to three. That is, four, five, or the like feature points may be selected. The number of feature points to be selected differs according to the kind of desired invariant. For example, an invariant calculated from three points is a similarity invariant.

Figure 9:
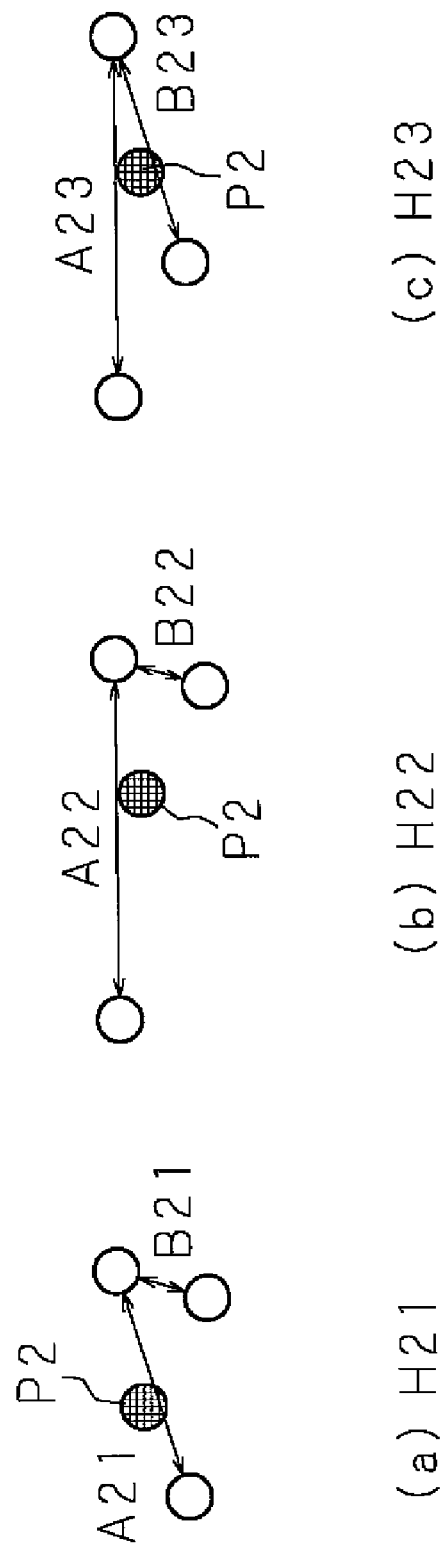
FIG. 9 is an explanatory diagram showing an example of calculation of an invariant with respect to a current feature point.

FIG. 8 is an explanatory diagram showing an example of calculation of an invariant with respect to a current feature point P1. FIG. 9 is an explanation diagram showing an example of calculation of an invariant with respect to the current feature point P2. As shown in FIG. 8, three feature points are selected from the four feature points surrounding the current feature point P1. Then, three kinds of invariants are denoted respectively by $H1j$ ($j=1, 2, 3$). Each invariant $H1j$ is calculated by a formula expressed by $H1j=A1j/B1j$. Here, each of $A1j$ and $B1j$ indicates the distance between feature points, and the distance is calculated on the basis of the coordinates of respective feature points. Thus, for example, even when the document is rotated, moved, or inclined, the invariant $H1j$ does not vary. Accordingly, determination of the similarity of the image is achieved with satisfactory accuracy, and hence a similar document can be determined with satisfactory accuracy.

Similarly, as shown in FIG. 9, three feature points are selected from the four feature points surrounding the current feature point P2. Then, three kinds of invariants are denoted respectively by $H2j$ ($j=1, 2, 3$). Each invariant $H2j$ is calculated by a formula expressed by $H2j=A2j/B2j$. Here, each of $A2j$ and $B2j$ indicates the distance between feature points, and the distance is calculated on the basis of the coordinates of respective feature points, as the same described. In accordance with a similar procedure, invariants can be calculated for the other current feature points.

On the basis of the invariants calculated for each current feature point, the features calculating section 222 calculates a hash value (features) Hi. The hash value of the current feature point Pi is expressed by $Hi=(Hi1\times10^2+Hi2\times10^1+Hi3\times10^0)/E$. Here, E is a constant determined by how large remainder is expected. For example, when the constant is set to be "10", the remainder falls between "0" and "9". This gives the range that can be taken by the calculated hash value. Further, i is a natural number, and i indicates the number of feature points.

Figure 11:
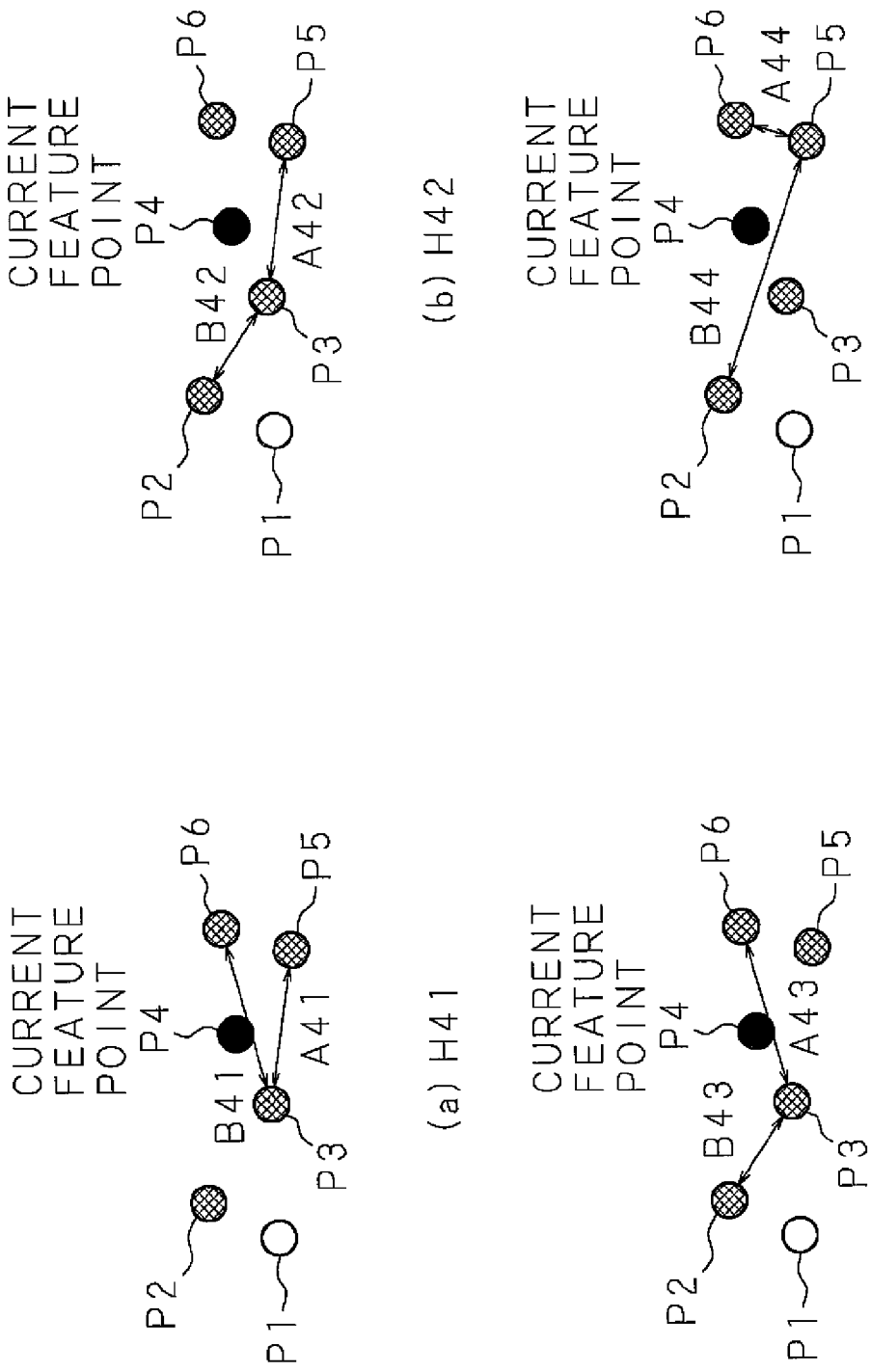
FIG. 11 is an explanatory diagram showing another example of calculation of an invariant with respect to a current feature point.

FIG. 10 is an explanatory diagram showing another example of calculation of an invariant with respect to a current feature point P3. FIG. 11 is an explanation diagram showing another example of calculation of an invariant with respect to a current feature point P4. As shown in FIG. 10, four kinds of combinations may be selected from the four points consisting of the surrounding feature points P1, P2, P4, and P5 of the current feature point P3. Then, similarly to the above-mentioned case, invariants $H3j$ (j=1, 2, 3, 4) may be calculated by $H3j=A3j/B3j$.

Further, as shown in FIG. 11, four kinds of combinations may be selected from the four points consisting of the surrounding feature points P2, P3, P5, and P6 of the current feature point P4. Then, similarly to the above-mentioned case, invariants $H4j$ (j=1, 2, 3, 4) may be calculated by $H4j=A4j/B4j$. In the cases of the examples of FIG. 10 and FIG. 11, the hash value Hi of a current feature point Pi is calculated by $Hi=(Hi1\times10^3+Hi2\times10^2+Hi3\times10^1+Hi4\times10^0)/E$.

Here, the above-mentioned hash value serving as features is an example, and is not limited to this. Another hash function may be employed. The above-mentioned example has been described for the case that four points are extracted as other surrounding feature points. However, the number of points is not limited to four. For example, six points may be extracted. In this case, five points may be extracted from the six feature points. Then, for each of the six kinds of methods of extracting five points, invariants may be calculated by extracting three points from the five points, so that a hash value may be calculated. This permits that one hash value is calculated from one feature point, and also that a plurality of hash values are calculated from one feature point.

The features calculating section 222 stores: an index indicating a feature point of the document image; a hash value calculated with respect to the feature point; and the coordinates of the feature point on the document image; as a feature point coordinate table for the document image into the memory 226.

When the document image is to be stored, for example, a document storing mode is selected in the operation panel 4 of the image forming apparatus, so that storing is performed. Whether the document storing mode is selected is determined by the control section 227. When the document storing mode is not selected, ordinary operation of copying, filing, e-mail transmission, or the like is performed. Here, in addition to being performed by a dedicated hardware circuit such as the document matching process section 22, the document storing process may be performed by a method in which a computer program that defines the procedure of document storing process is loaded onto a personal computer having a CPU, a RAM, a ROM, and the like and then the computer program is executed by the CPU.

FIG. 12 is an explanation diagram showing the structure of a feature point coordinate table 2261 for a document image. The feature point coordinate table 2261 for a document image is composed of respective fields for: an index indicating a feature point of the document image; a hash value calculated with respect to the feature point; and the coordinates (x'-coordinate, y'-coordinate) of a feature point on the document image. As shown in FIG. 12, for example, the hash value calculated with respect to the feature point in which the index indicating a feature point of the document image is p1 is H1. The coordinates of the feature point are (x11',y11'). Further, similarly, the hash value calculated with respect to the feature point in which the index indicating a feature point of the document image is p2 is H8. The coordinates of the feature point are (x32',y32').

FIGS. 13A and 13B are explanation diagrams showing the structure of a hash table 2262 for reference formats. As shown in FIG. 13A, the structure of the hash table 2262 includes respective fields of a hash value and an index that indicates a document (a reference format). More specifically, in correspondence to an index that indicates a document, a point index that indicates a position in the document and an invariant (both are not shown) are stored. The hash table 2262 is stored in the memory 226. Further, for the purpose of determination of the similarity of an image, reference formats (images to be matched and document images) are stored in advance in the memory 226. Here, as shown in FIG. 13B, when hash values are equal to each other (H1=H5), the two entries in the hash table 2262 may be unified.

FIG. 14 is an explanation diagram showing the structure of a feature point coordinate table 2263 for reference formats. The feature point coordinate table 2263 for reference formats is stored in the memory 226, and composed of respective fields of: an index indicating a document for specifying each reference format; an index indicating a feature point for specifying the feature point calculated in each reference format; and the coordinates (x-coordinate, y-coordinate) of each feature point on the reference format.

As shown in FIG. 14, for example, the reference format having the index ID1 indicating the document has feature points f11, f12, f13, f14, . . . . The coordinates of the individual feature points on the reference format are (x11,y11), (x12, y12), (x13,y13), (x14,14), . . . . The situation is similar to the other reference formats ID2, . . . .

On the basis of the hash value (features) calculated by the features calculating section 222, the vote processing section 223 searches the hash table 2262 for reference formats stored in the memory 226. When the hash value agrees, the vote processing section 223 votes for the index indicating the document stored at the hash value (that is, the image in which the same hash value has been calculated). The result obtained by accumulating the votes is outputted as the number of obtained votes to the similarity determination processing section 224. Further, when the hash value of the document image and the hash value of the reference format agree with each other, the vote processing section 223 determines which feature point in which reference format has been voted by the feature point of the document image, and then stores the determination result as a feature point vote table 2264 in the memory 226.

FIG. 15 is an explanation diagram showing the structure of the feature point vote table 2264. In the feature point vote table 2264, indices p1, p2, . . . each indicating a feature point of a document image are recorded in each element of a matrix composed of: indices f11, f21, . . . , fn1 (denoted by "fn1", hereinafter) each indicating a feature point of a reference format corresponding to indices ID1, ID2, ID3, ID4, . . . , IDn each indicating the document of a reference format; f12, f22, . . . , fn2 (denoted by "fn2", hereinafter); and similarly, fn3, fn4, fn5, fn6, fn7, . . . .

As shown in FIG. 15, for example, it is determined that the hash value calculated for the feature point of the document image expressed by the index p1 agrees with the hash value of the feature point f11 having the index ID1 indicating the document of the reference format. Further, for example, it is determined that the hash value calculated for the feature point of the document image expressed by the index p2 agrees with the hash value of the feature point f32 having the index ID3 indicating the document of the reference format. Furthermore, for example, it is determined that the hash value calculated for the feature point of the document image expressed by the index p3 agrees with the hash value of the feature point f13 having the index ID1 indicating the document of the reference format. The situation is similar to the subsequent indices p4, p5, p6, p7, . . . .

On the basis of the voting result inputted from the vote processing section 223, the similarity determination processing section 224 determines whether the read document image is similar to any reference format, and then outputs the determination result to the write-in determination processing section 225. More specifically, the similarity determination processing section 224 divides the number of obtained votes inputted from the vote processing section 223 by the greatest number of obtained votes of the document image (expressed by the number of feature points×the number of hash values calculated from one feature point), so as to calculate a normalized similarity. Then, the similarity determination processing section 224 compares the calculated similarity with a threshold value Th (e.g., 0.8) determined in advance. When the similarity is greater than or equal to the threshold value Th, the similarity determination processing section 224 determines that the document image is similar to the reference format in which the similarity has been calculated. When the similarity is smaller than the threshold value Th, the similarity determination processing section 224 concludes the absence of a reference format similar to the document image, and then outputs the determination result to the write-in determination processing section 225. Here, the number of obtained votes inputted from the vote processing section 223 may be compared with a threshold value defined in advance. Then, when the number of obtained votes is greater than or equal to the threshold value, it may be determined that the document image is similar to a reference format stored in advance, and further it may be determined that a reference format having the greatest number of obtained votes among the reference formats determined as being similar is identical to the document image.

Figure 16:
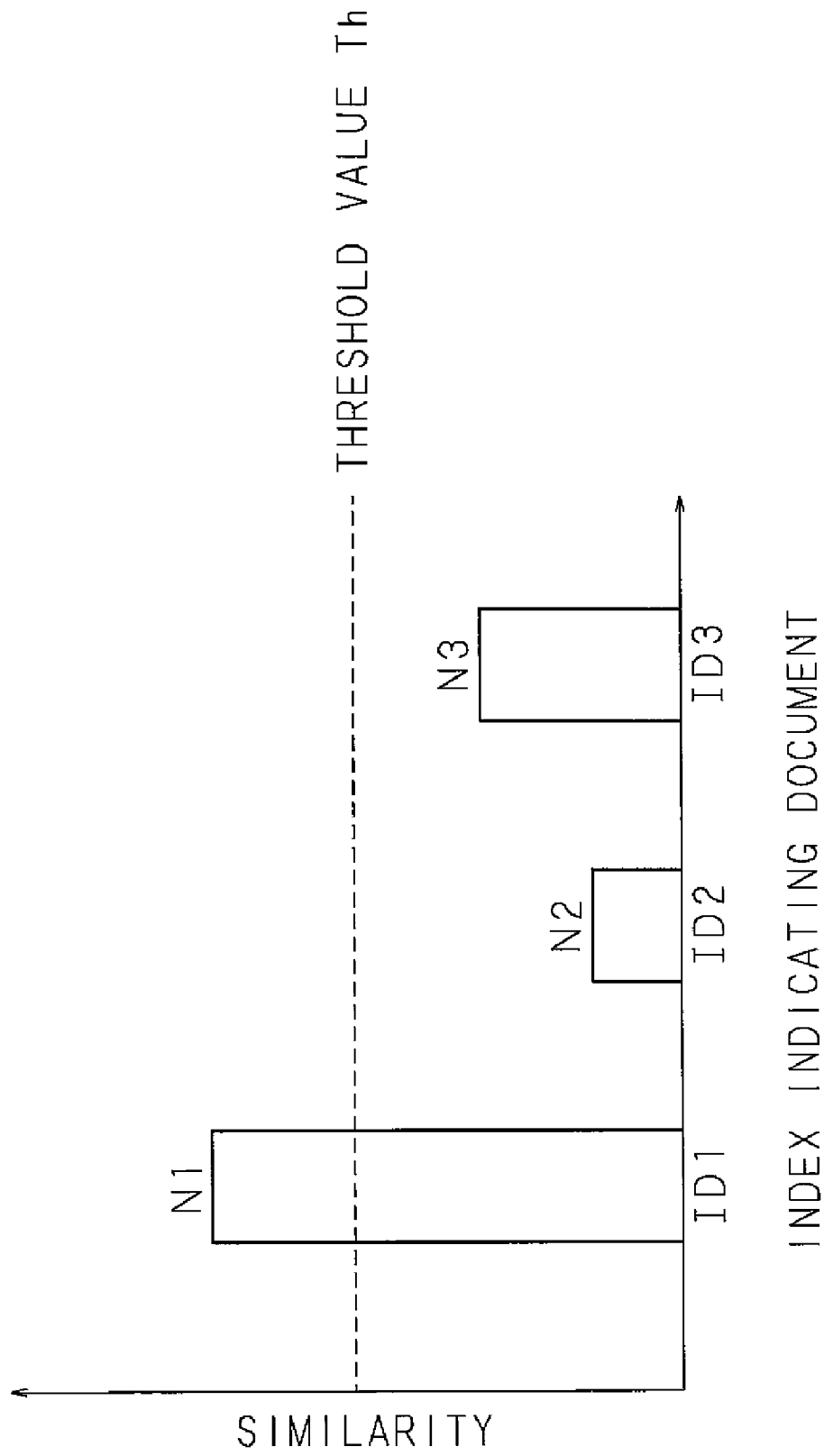
FIG. 16 is an explanation diagram showing an example of similarity determination based on a voting result.

FIG. 16 is an explanation diagram showing an example of similarity determination based on a voting result. As shown in FIG. 16, the hash table 2262 is searched and vote is performed for each hash value calculated from the read document image. Then, it is assumed that as a result, vote has been performed for the reference formats in which the indices indicating the documents are ID1, ID2, and ID3. Then, each number of obtained votes obtained as a result of the voting is divided by the greatest number of obtained votes of the document image, so that normalized similarities N1, N2, and N3 are calculated. The reference format having a calculated similarity greater than or equal to the threshold value Th is that has the index ID1 indicating the document. Thus, the document image is determined as being similar to the reference format having the index ID1 indicating the document.

When the determination result that the document image is similar to the reference format is outputted from the similarity determination processing section 224, the write-in determination processing section 225 determines whether write-in is present in the document image, and then outputs a determination signal that indicates the presence or absence of write-in. More specifically, the write-in determination processing section 225 performs: position alignment processing of aligning the document image and the reference format; difference processing of calculating the difference of the pixel values (e.g., luminance values) of each pixel between the document image and the reference format; and determination process of determining whether write-in is present in the document image, on the basis of the calculated difference.

Next, the position alignment processing of transforming the coordinate system of the reference format into the coordinate system of the document image so as to align the positions between the images is described below. In the processing that the coordinate system of the reference format is transformed into the coordinate system of the document image so that position alignment is performed between the images, the entire reference format may be transformed. Alternatively, a part where coordinate transformation is to be performed may be set up (or defined in advance) for each entry field of the reference format. Then, coordinate transformation may be performed only on the part having been set up so. First, the case that the entire reference format is transformed and then aligned with the document image is described below. Here, in the following description, it is assumed that the document image has been determined as being similar to the reference format having the index ID1 indicating the document.

The write-in determination processing section 225 accesses the memory 226 and extracts from the feature point vote table 2264 a feature point of the document image having voted for the index ID1 indicating the document. In the example of FIG. 15, the indices indicating feature points of the document image are p1, p3, p4, and p7. The write-in determination processing section 225 specifies indices f11, f13, f14, and f17 indicating the feature points of the reference format corresponding to the indices p1, p3, p4, and p7 indicating the feature points of the extracted document image (the hash values agree with each other). With reference to the feature point coordinate table 2263 for reference formats and the feature point coordinate table 2261 for the document image, the write-in determination processing section 225 calculates a matrix Jin concerning the coordinates of the feature points of the reference format expressed by Formula (1) and a matrix Jout concerning the coordinates of the feature points of the document image expressed by Formula (2). The transformation coefficients in a transformation matrix W are assumed to be Formula (3).

[Formulas 1]

$$Jin = \begin{pmatrix} x11 & y11 & 1 \\ x13 & y13 & 1 \\ x14 & y14 & 1 \\ x17 & y17 & 1 \end{pmatrix} \quad (1)$$

$$Jout = \begin{pmatrix} x11' & y11' & 1 \\ x13' & y13' & 1 \\ x14' & y14' & 1 \\ x17' & y17' & 1 \end{pmatrix} \quad (2)$$

-continued $$W = \begin{pmatrix} a & b & c \\ d & e & f \\ g & h & i \end{pmatrix} \quad (3)$$

The write-in determination processing section 225 calculates the transformation matrix W in accordance with Formula (4). In this case, the transposed matrix JinT of Jin is multiplied to both sides of Formula (4), so that Formula (5) is obtained. Further, the inverse matrix of JinT Jin is multiplied to both sides of Formula (5), so that Formula (6) is obtained. As a result, the transformation coefficients are calculated. Using the transformation matrix W expressed by the calculated transformation coefficients, the write-in determination processing section 225 transforms arbitrary coordinates (x,y) on the reference format into coordinates (x',y') on the document image as shown by Formula (7).

[Formulas 2]

$$J\text{out}=J\text{in}\times W \quad (4)$$

$$J\text{in}^T J\text{out}=J\text{in}^T J\text{in}\times W \quad (5)$$

$$(J\text{in}^T J\text{in})^{-1} J\text{in}^T J\text{out}=W \quad (6)$$

$$(x',y',1)=(x,y,1)\times A \quad (7)$$

Figure 17:
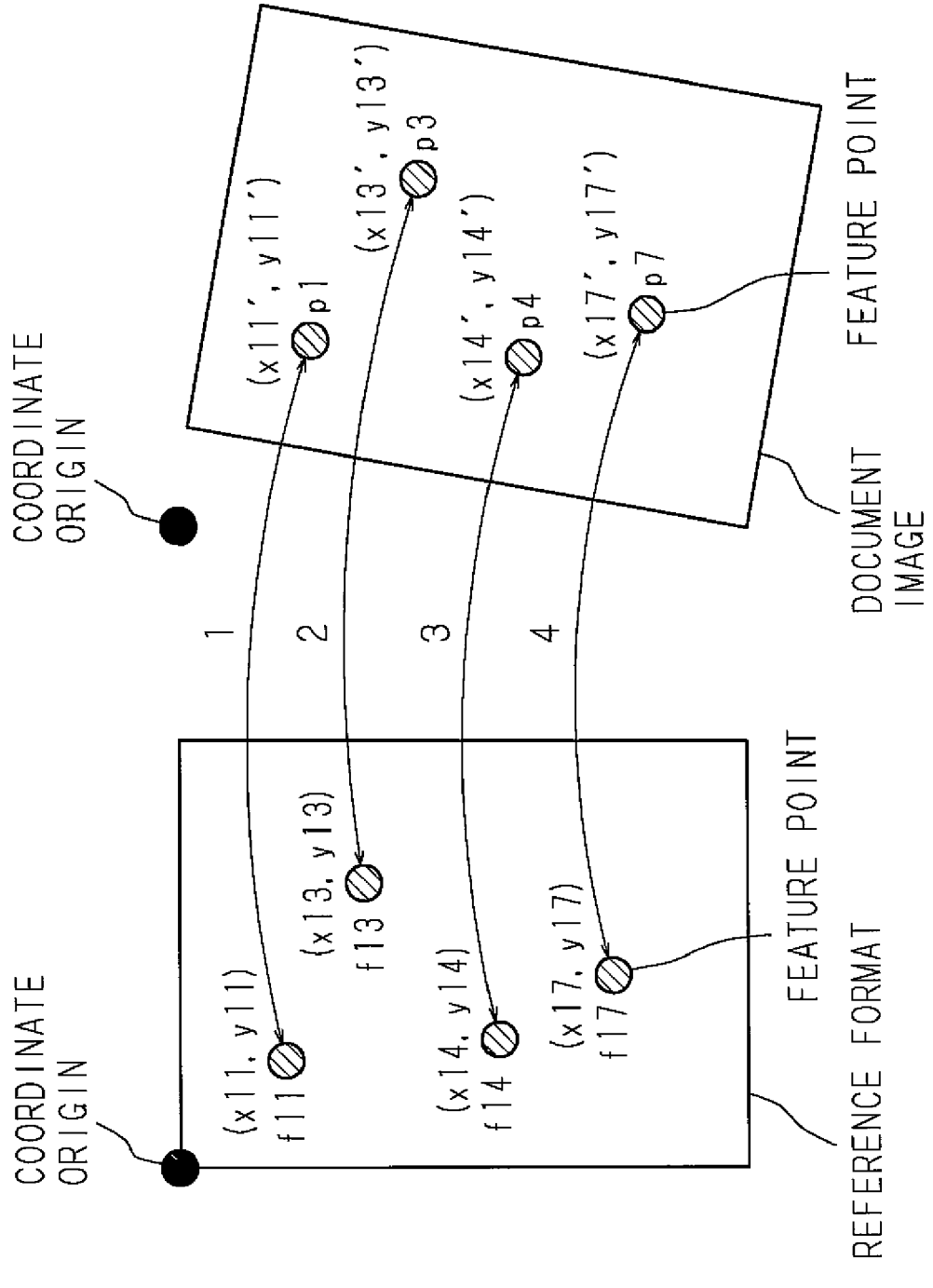
FIG. 17 is an explanation diagram showing position alignment between a document image and a reference format.

FIG. 17 is an explanation diagram showing position alignment between the document image and the reference format. As shown in FIG. 17, when correspondence is established respectively between the feature points f11, f13, f14, and f17 of the reference format and the feature points p1, p3, p4, and p7 of the document image, even in a case that the positions of the coordinate origin (the pixel at the upper left of the image) of the reference format and the pixel at the upper left of the document image deviate from each other, the coordinate origins of the two images can be made to agree with each other, so that position alignment is achieved between the reference format and the document image. Here, the number of feature points of each image is not limited to four. Further, depending on the format of a reference format, in a case that a large number of feature points are present, several feature points may be selected from among them.

Next, the difference processing of calculating the difference of the pixel values of each pixel between the document image and the reference format is described below. The write-in determination processing section 225 scans the pixels in the document image and the reference format having undergone position alignment, sequentially, for example, from the upper left to the lower right of the two images, and thereby calculates the difference of the luminance values of corresponding current pixels in the two images. In this case, with taking into consideration the reproducibility or the like of the pixel value at the time of reading the document, in a case that the image is expressed in 256 gray levels, when the difference of the luminance values of corresponding pixels in the two images falls within a range of 5 to 10 (a difference threshold value Tg), the current pixels are determined as being the same. For example, when the luminance value of a particular current pixel in the document image is 210 while the luminance value of the corresponding current pixel in the reference format is 215, it is determined that the two current pixels are the same. Further, for example, when the luminance value of a particular current pixel in the document image is 210 while the luminance value of the corresponding current pixel in the reference format is 235, it is determined that the two current pixels are not the same.

The write-in determination processing section 225 determines whether the ratio obtained when the number of pixels (the number M of determined pixels) in which the pixel values have been determined as being the same is divided by the number of pixels owned by the reference format is smaller than a ratio threshold value Ts (e.g., 0.99). Then, when the calculated ratio is smaller than the ratio threshold value Ts, the write-in determination processing section 225 estimates the presence of write-in in the document image, and then outputs a determination signal. Further, when the calculated ratio is greater than or equal to the ratio threshold value Ts, the write-in determination processing section 225 estimates the absence of write-in in the document image, and then outputs a determination signal. Here, it may be determined whether the ratio obtained when the number of pixels in which the pixel values have been determined as being not the same is divided by the number of pixels owned by the reference format is greater than a ratio threshold value Td (e.g., 0.01). Then, when the calculated ratio is greater than the ratio threshold value Td, it may be determined that write-in is present in the document image. In contrast, when the calculated ratio is smaller than or equal to the ratio threshold value Td, it may be determined that write-in is absent in the document image.

That is, in the write-in determination process, the differences of the pixel values owned by the obtained document image and the reference format (reference image) are calculated. Then, the calculated difference values are compared with a predetermined threshold value (difference threshold value), so that the number of pixels (the number of determined pixels) having approximately the same pixel value is calculated. Then, the ratio obtained by dividing the calculated number of determined pixels by the total number of pixels owned by the reference format is calculated. Then, the calculated ratio is compared with a predetermined threshold value (ratio threshold value) (larger-or-smaller comparison). Then, the presence or absence of write-in is determined in accordance with the comparison result.

Next, the case that a part where coordinate transformation is to be performed is set up for each entry field of the reference format and then transformation is performed only on the set-up part so that so that position alignment is achieved between the reference format and the document image is described below. In this case, determination whether write-in is present is performed on the part set up as a part where coordinate transformation is to be performed.

FIGS. 18A and 18B are explanatory diagrams showing an example of a reference format. As shown in FIG. 18A, in the reference format (that is, a document having a predetermined format), respective entry fields are provided for the date, the name, the address, the telephone number, and the entry item. Further, as shown in FIG. 18B, setup may be performed such that coordinate transformation is performed only on the name, the address, and the entry item (shaded areas in the figure) among the entry fields of the reference format. The part where coordinate transformation is to be performed may be set up in advance for each reference format, and then the setup information (a coordinate transformation target table for the reference format) may be stored in the memory 226. Alternatively setup for respective entry fields such as the name, the address, and the entry item may be performed in accordance with user operation through the operation panel 4.

Figures 19A, 19B:
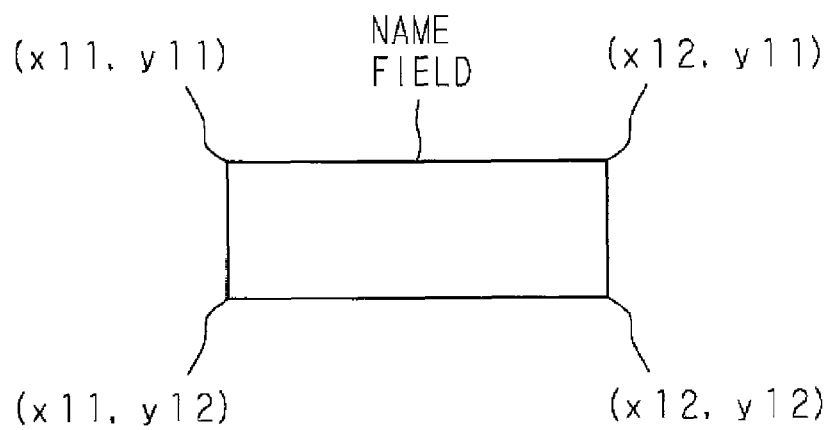
FIGS. 19A and 19B are explanatory diagrams showing an example of a coordinate transformation target table for a reference format.

FIGS. 19A and 19B are explanatory diagrams showing an example of a coordinate transformation target table 2265 for a reference format. As shown in FIG. 19A, the coordinate transformation target table 2265 is composed of: the index indicating the document of a reference format; the entry field of a reference format; and the coordinates of the entry field. Further, as shown in FIG. 19B, the position of the entry field on the reference format is specified by the coordinates of the four corners of the entry field on the reference format. In FIG. 19B, the coordinates (x11,y11), (x12,y11), (x11,y12), and (x12,y12) of the name field are shown as an example among the entry fields of the reference format having the index ID1 indicating the document. As shown in the figure, for example, in the reference format having the index ID1 indicating the document, the respective entry fields of the name, the address, and the entry item are a target of coordinate transformation. The entry field of the name is specified by the diagonal coordinate values (x11,y11) and (x12,y12) on the coordinate of the reference format.

In this case, the write-in determination processing section 225 accesses the memory 226 and extracts from the feature point vote table 2264 a feature point of the document image having voted for the index ID1 indicating the document. The write-in determination processing section 225 specifies an index indicating the feature point of the reference format that corresponds to the index indicating the feature point of the extracted document image (the hash values agree with each other). With reference to the feature point coordinate table 2263 for the reference format, the feature point coordinate table 2261 for the document image, and the coordinate transformation target table 2265, and on the basis of the feature point inside the coordinate transformation target, the write-in determination processing section 225 transforms the coordinates (x,y) of the entry field on the reference format into coordinates (x',y') on the document image by transformation processing similar to that described above. Further, the write-in determination processing section 225 performs: difference processing of calculating the difference of the pixel values (e.g., luminance values) of each pixel in the entry field between the document image and the reference format; and determination process of determining whether write-in is present in the document image, on the basis of the calculated difference. This allows the write-in determination process to be performed in a state that coordinate transformation has been performed only on the part where the presence or absence of write-in is to be determined. Accordingly, in comparison with the case that the entire image is processed, processing work effort is reduced, and hence the write-in determination process is performed at a high speed.

Figure 20:
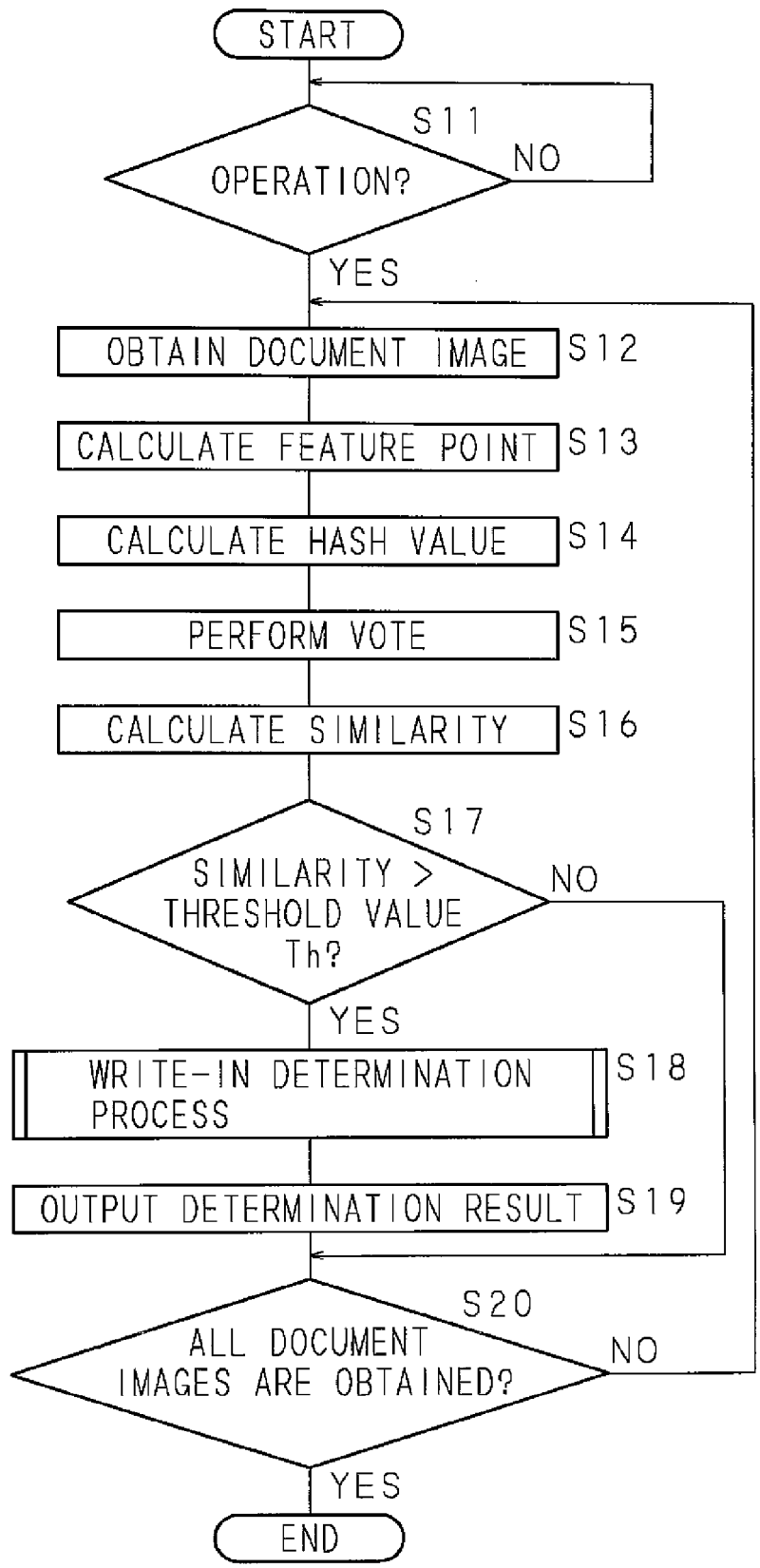
FIG. 20 is a flow chart showing a procedure of document matching process.

Next, the operation of the image forming apparatus 100 is described below. FIG. 20 is a flow chart showing the procedure of document matching process. Here, in place of implementation by a dedicated hardware circuit, the document matching process may be performed by loading a computer program that defines the procedure of document matching process onto a personal computer provided with a CPU, a RAM, a ROM, and the like and then causing the CPU to execute the computer program. Further, in addition to the document matching process, the computer program may includes output control process of controlling the output such as copying and electronic distribution in accordance with a result determined in the document matching process.

The control section 227 determines the presence or absence of operation from a user (document reading operation) (S11). In the case of absence of operation (NO at S11), the processing of step S11 is continued, and hence operation from a user is awaited. In the case of presence of operation from a user (YES at S11), the control section 227 obtains a document image obtained by document read in the color image input apparatus 1 (S12). The control section 227 calculates a feature point on the basis of the obtained document image (S13), and then calculates a hash value (features) on the basis of the calculated feature point (S14). The control section 227 searches the hash table 2262 for reference formats on the basis of the calculated hash value (features), and then votes for an index indicating a document in which the hash values agree with each other (S15). In this case, the control section 227 determines which feature point in which reference format has been voted by the feature point of the document image, and then stores the determination result.

The control section 227 divides the number of obtained votes by the greatest number of obtained votes of the document image so as to calculate the similarity (S16), and then determines whether the calculated similarity is greater than the threshold value Th (S17). When the similarity is greater than the threshold value Th (YES at S17), the control section 227 performs write-in determination process (S18). Here, details of the write-in determination process are described later. The control section 227 outputs the determination result obtained in the write-in determination process (S19). Here, the CPU (not shown) in the color image processing apparatus 2 performs predetermined output control described later in accordance with the determination result.

The control section 227 determines whether all the document images have been obtained (S20). When not all the document images have been obtained (NO at S20), the control section 227 continues the processing at and after step S12. On the other hand, when the similarity is not greater than the threshold value Th (NO at S17), the control section 227 continues the processing at and after step S20. When all the document images have been obtained (YES at S20), the control section 227 terminates the processing.

FIG. 21 is a flow chart showing a procedure of write-in determination process. The control section 227 transforms the coordinate system (coordinate values) of a reference format determined as being similar to the document image into the coordinate system (coordinate values) of the document image (S101). In this case, coordinate transformation may be performed on the entire reference format. Alternatively, coordinate transformation may be performed only on entry fields having been set up in the reference format.

The control section 227 sets into "0" the number M of determined pixels that indicates the number of pixels having the same pixel value (e.g., luminance value) among respective pixels between the document image and the reference format (S102), and then scans the current pixels in the document image and the reference format so as to calculate the difference of the pixel values for the respective current pixels (S103). The control section 227 determines whether the calculated difference is smaller than the difference threshold value Tg (S104). When the difference is smaller than the difference threshold value Tg (YES at S104), the control section 227 adds "1" to the number M of determined pixels (S105). The control section 227 determines whether the processing has been completed for all the pixels in the document image and the reference format (S106). When processing for all the pixels is not yet completed (NO at S106), the processing at and after step S103 is continued.

When the difference is not smaller than the difference threshold value Tg (NO at S104), the control section 227 continues the processing at and after step S106. When the processing has been completed for all the pixels (YES at S106), the control section 227 determines whether the ratio expressed by (the number M of determined pixels/the number of pixels in the reference format) is smaller than the ratio threshold value Ts (S107). When the ratio is smaller than the ratio threshold value Ts (YES at S107), the control section 227 estimates the presence of write-in (S108), and then terminates the processing. On the other hand, when the ratio is not smaller than the ratio threshold value Ts (NO at S107), the control section 227 estimates the absence of write-in (S109), and then terminates the processing.

As described above, in the write-in determination process, determination is performed on the basis of the ratio obtained when the number of pixels having the same pixel value between the document image and the reference format is divided by the number of pixels in the reference format. This provides an advantage that even when noise causes pixels in the document image to have pixel values different from their intrinsic pixel values, influence of the noise is reduced when divided by the number of pixels in the reference format.

In accordance with the determination result of write-in determination process, the CPU (not shown) in the color image processing apparatus 2 controls output process such as copying, electronic distribution, and recording for the read document. Here, in a case that the document is composed of a plurality of sheets, when it is determined that write-in is present in at least one document sheet, output process such as copying, electronic distribution, and recording for the read document may be controlled.

FIG. 22 is an explanation diagram showing an example of control of output process. In the figure, the selection option may be set up in advance in the apparatus, or alternatively may be set up by the user through the operation panel 4. Further, the selection option may be a single option or a combination of a plurality of options. For example, in a case that option F1 is set up, when it is determined that write-in is present in the document image, copying or electronic distribution of the document image is inhibited. In contrast, when it is determined that write-in is absent, copying or electronic distribution of the document image is permitted.

Further, in a case that option F2 is set up, when it is determined that write-in is present in the document image, filing of the document image is permitted. In contrast, when it is determined that write-in is absent, filing of the document image is inhibited. Further, in a case that option F3 is set up, when it is determined that write-in is present in the document image, copying or electronic distribution of the reference format is permitted. Further, in a case that option F4 is set up, when it is determined that write-in is present in the document image, copying or electronic distribution is permitted only for the reference format and for the write-in in unimportant parts (entry fields). That is, when option F4 is set up, copying or electronic distribution is inhibited for important parts (specifically, parts where important matter, personal information, confidential information, or the like is written) in the document image.

FIGS. 23A and 23B are explanatory diagrams showing an example output of a document image. In FIGS. 23A and 23B, as shown in the example of FIG. 18B, determination of the presence or absence of write-in is performed only on the respective entry fields of the name, the address, and the entry item among the entry fields of the reference format, while the determination of the presence or absence of write-in is not performed on the other entry fields. Further, it is assumed that option F4 is set up as output control. In this case, when write-in is present in the date, the name, the address, the telephone number, and the entry item in the document image as shown in FIG. 23A, in the outputted image obtained by copying or electronic distributing the document image, the respective entry fields of the name, the address, and the entry item are important parts, and hence the written contents are masked and not outputted as shown in FIG. 23B. On the other hand, the respective entry fields of the date and the telephone number are not important parts, and hence are outputted similarly to the reference format (a blank format without write-in).

Embodiment 2

The paper sheet material of a document to be read is not restrict to white paper, and can be recycled paper or thinly colored paper. Even in such cases, when page background removal process is performed on the document image, the presence or absence of write-in can be determined with satisfactory accuracy. In this case, the page background removal process may be performed in the document matching process section 22. Alternatively, the input tone correction section 23 may be provided in the subsequent stage of the shading correction section 21, and then the document matching process section 22 may be provided in the subsequent stage of the input tone correction section 23, so that the page background removal process may be performed in the input tone correction section 23. In a case that page background is to be removed from the document image, the reference format is stored in a state that page background removal process has been performed similarly. Alternatively, page background removal is performed on the document image such that its page background should be at the same level as the page background of the reference format. This may be achieved by setting up appropriately a density correction table used in the page background removal.

The document matching process section 22 extracts a signal obtained by correction inversion of the G signal among the RGB signals inputted from the shading correction section 21, and then generates a density histogram of the document image with a condition that, for example, 256 density steps are divided into 16 bins. Further, the maximum of density values determined as being page background is stored in advance as a first threshold value in the memory 226. At the same time, the number of pixels in which the pixels are determined as being page background when exceeding that number of pixels, that is, the minimum in the number of pixels determined as being page background, is stored in advance as a second threshold value in the memory 226. Further, a density correction table used for removing page background in correspondence to the density segment determined as being page background is stored in the memory 226.

The document matching process section 22 searches from the high density side of the generated density histogram, so as to extract as being page background a density segment that has a density value smaller than or equal to the first threshold value density segment which is determined as being page background and that has the number of pixels greater than or equal to the second threshold value density segment. The document matching process section 22 performs page background removal process by using the density correction table corresponding to the density segment extracted as being page background. Here, in place of the G signal, a luminance signal (255-Yj) may be used. Here, when the color components RGB of each pixel is denoted respectively by Rj, Gj, and Bj, Yj is expressed by $Yj=0.30 \times Rj+0.59 \times Gj+0.11 \times Bj$.

Figure 24:
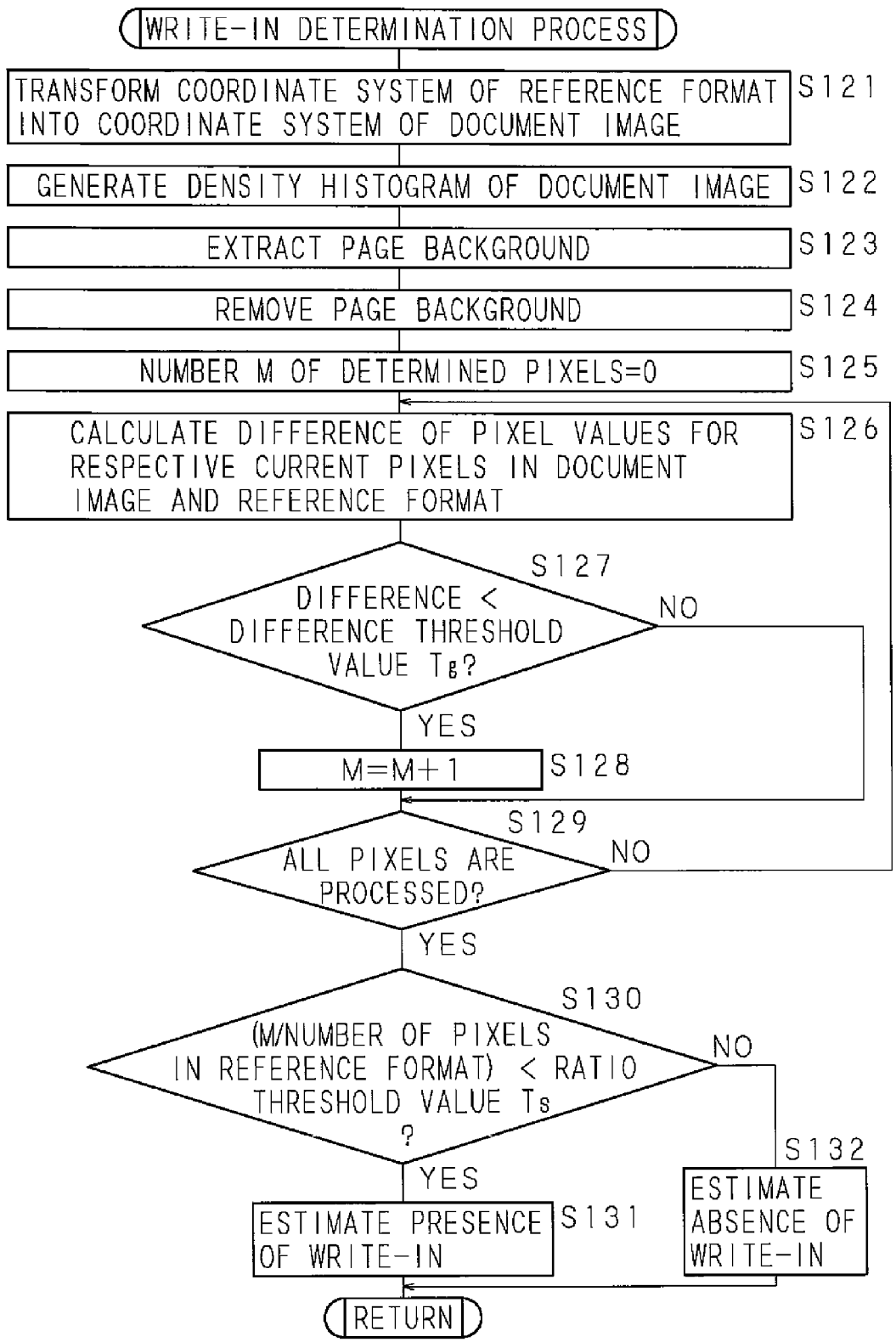
FIG. 24 is a flow chart showing a procedure of write-in determination process in Embodiment 2.

FIG. 24 is a flow chart showing a procedure of write-in determination process according to Embodiment 2. The control section 227 transforms the coordinate system (coordinate values) of a reference format determined as being similar to the document image into the coordinate system (coordinate values) of the document image (S121). Here, in this case, similarly to Embodiment 1, coordinate transformation may be performed on the entire reference format. Alternatively, coordinate transformation may be performed only on entry fields having been set up in the reference format.

On the basis of the signal obtained by correction inversion of the G signal extracted from the document image, the control section 227 generates a density histogram of the document image (S122), and then extracts page background by searching from the high density side of the generated density histogram (S123). The control section 227 removes page background of the document image by using the density correction table corresponding to the density segment extracted as being page background (S124). The control section 227 sets into "0" the number M of determined pixels that indicates the number of pixels having the same pixel value (e.g., luminance value) among respective pixels between the document image and the reference format (S125), and then scans the current pixels in the document image and the reference format so as to calculate the difference of the pixel values for the respective current pixels (S126).

The control section 227 determines whether the calculated difference is smaller than the difference threshold value Tg (S127). When the difference is smaller than the difference threshold value Tg (YES at S127), the control section 227 adds "1" to the number M of determined pixels (S128). The control section 227 determines whether the processing has been completed for all the pixels in the document image and the reference format (S129). When processing for all the pixels is not yet completed (NO at S129), the processing at and after step S126 is continued.

When the difference is not smaller than the difference threshold value Tg (NO at S127), the control section 227 continues the processing at and after step S129. When the processing has been completed for all the pixels (YES at S129), the control section 227 determines whether the ratio expressed by (the number M of determined pixels/the number of pixels in the reference format) is smaller than the ratio threshold value Ts (S130). When the ratio is smaller than the ratio threshold value Ts (YES at S130), the control section 227 estimates the presence of write-in (S131), and then terminates the processing. On the other hand, when the ratio is not smaller than the ratio threshold value Ts (NO at S130), the control section 227 estimates the absence of write-in (S132), and then terminates the processing.

As a result, even when the paper sheet material of the read document is recycled paper or thinly colored paper, the presence or absence of write-in can be determined with satisfactory accuracy.

Embodiment 3

Embodiments 1 and 2 have been described for the configuration that the presence or absence of write-in is determined on the basis of the ratio expressed by (the number M of determined pixels/the number of pixels in the reference format). However, the write-in determination process is not limited to this configuration. That is, write-in determination process may be achieved by the document matching process section 22 calculating the number of pixels.

Figure 25:
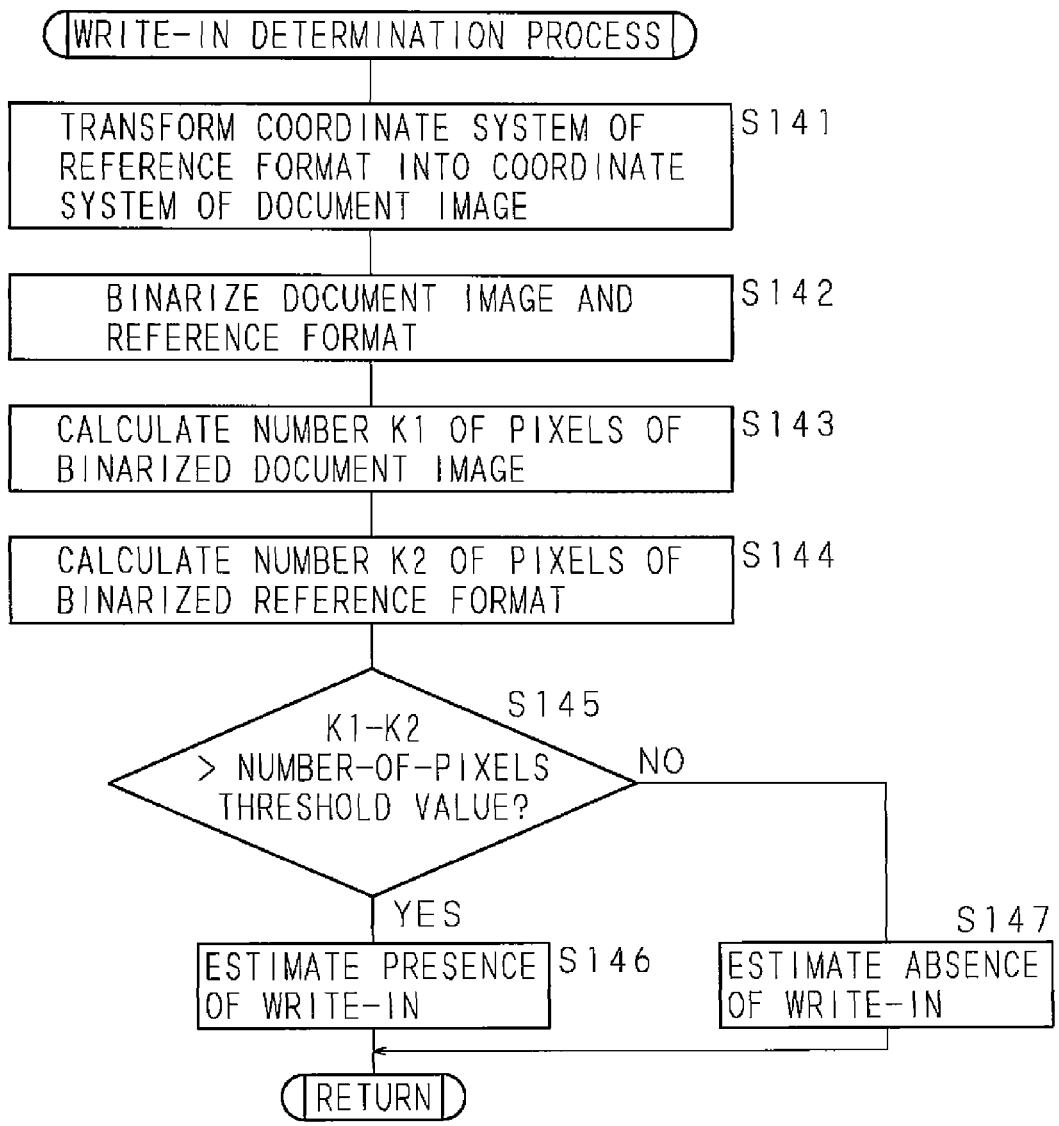
FIG. 25 is a flow chart showing a procedure of write-in determination process in Embodiment 3.

FIG. 25 is a flow chart showing a procedure of write-in determination process according to Embodiment 3. The control section 227 transforms the coordinate system (coordinate values) of a reference format determined as being similar to the document image into the coordinate system (coordinate values) of the document image (S141). Here, in this case, coordinate transformation may be performed on the entire reference format. Alternatively coordinate transformation may be performed only on entry fields having been set up in the reference format.

The control section 227 binarizes the document image and the reference format on the basis of a binarization threshold value defined for the document image in advance (e.g., 128 when the number of gradation levels of the document image is 256) (S142). The control section 227 calculates the number K1 of pixels of the binarized document image (S143), and then calculates the number K2 of pixels of the binarized reference format (S144). The control section 227 determines whether (K1-K2) is greater than a number-of-pixels threshold value (S145). Then, when (K1-K2) is greater than the number-of-pixels threshold value (YES at S145), the control section 227 estimates the presence of write-in (S146), and then terminates the processing. On the other hand, when (K1-K2) is not greater than the number-of-pixels threshold value (NO at S145), the control section 227 estimates the absence of write-in (S147), and then terminates the processing. The number-of-pixels threshold value may be set up when a value that permits accurate determination of the presence or absence of write-in is obtained on the basis a large number of image samples.

When the configuration that the number of pixels is calculated is adopted, the presence or absence of write-in can be determined with satisfactory accuracy even in the case of tiny write-in regardless of the size of the area of the entry field in the document.

Embodiment 3 has been described above for the configuration that the number of pixels after binarization is calculated. In place of this, the number of black pixels in the document image may be calculated. Also in this case, the presence or absence of write-in can be determined with satisfactory accuracy even in the case of tiny write-in regardless of the size of the area of the entry field in the document.

Further, in place of the configuration that the number of pixels after binarization is calculated, the number M of determined pixels calculated in Embodiments 1 and 2 may be compared with a predetermined threshold value. Then, for example, when the number M of determined pixels is greater than the predetermined threshold value, it may be interpreted that a large number of pixels have the same pixel value in the document image and the reference format, and hence the absence of write-in may be estimated. In contrast, when the number M of determined pixels is smaller than the predetermined threshold value, it may be interpreted that only a small number of pixels have the same pixel value in the document image and the reference format, and hence the presence of write-in may be estimated.

That is, in this case, in the write-in determination process, the differences of the pixel values owned by the obtained document image and the reference format (reference image) are calculated. Then the calculated difference values are compared with a predetermined threshold value (difference threshold value), so that the number of pixels (the number of determined pixels) having approximately the same pixel value is calculated. Then, the calculated number of determined pixels is compared with a predetermined threshold value (large and small comparison). Then, the presence or absence of write-in is determined in accordance with the comparison result.

Further, the processing of write-in determination based on the ratio shown in FIG. 24 and the processing of write-in determination based on the calculation of the number of pixels shown in FIG. 25 may be employed simultaneously. In this case, when the ratio expressed by (the number M of determined pixels/the number of pixels in the reference format) is smaller than the ratio threshold value Ts and (K1-K2) is greater than the number-of-pixels threshold value (or alternatively the number M of determined pixels is not greater than a predetermined threshold value), the control section 227 estimates the presence of write-in. In contrast, when the ratio expressed by (the number M of determined pixels/the number of pixels in the reference format) is not smaller than the ratio threshold value Ts and (K1-K2) is not greater than the number-of-pixels threshold value (or alternatively the number M of determined pixels is greater than a predetermined threshold value), the control section 227 estimates the presence of write-in. Here, when any one of the criteria is not satisfied, priority may be imparted to any one of the determination results depending on the kind of the document or the like. When the write-in determination based on the ratio and the write-in determination based on the number of pixels are employed simultaneously, the write-in determination accuracy is improved further.

Embodiment 4

In each embodiment described above, in the determination of the presence or absence of write-in, the pixel values have been compared between the document image and the reference format. However, the method of determination of the presence or absence of write-in is not limited to this. That is, without the necessity of comparison with the pixel value of the reference format, the presence or absence of write-in in the document image can be determined only on the basis of the document image.

Figure 26:
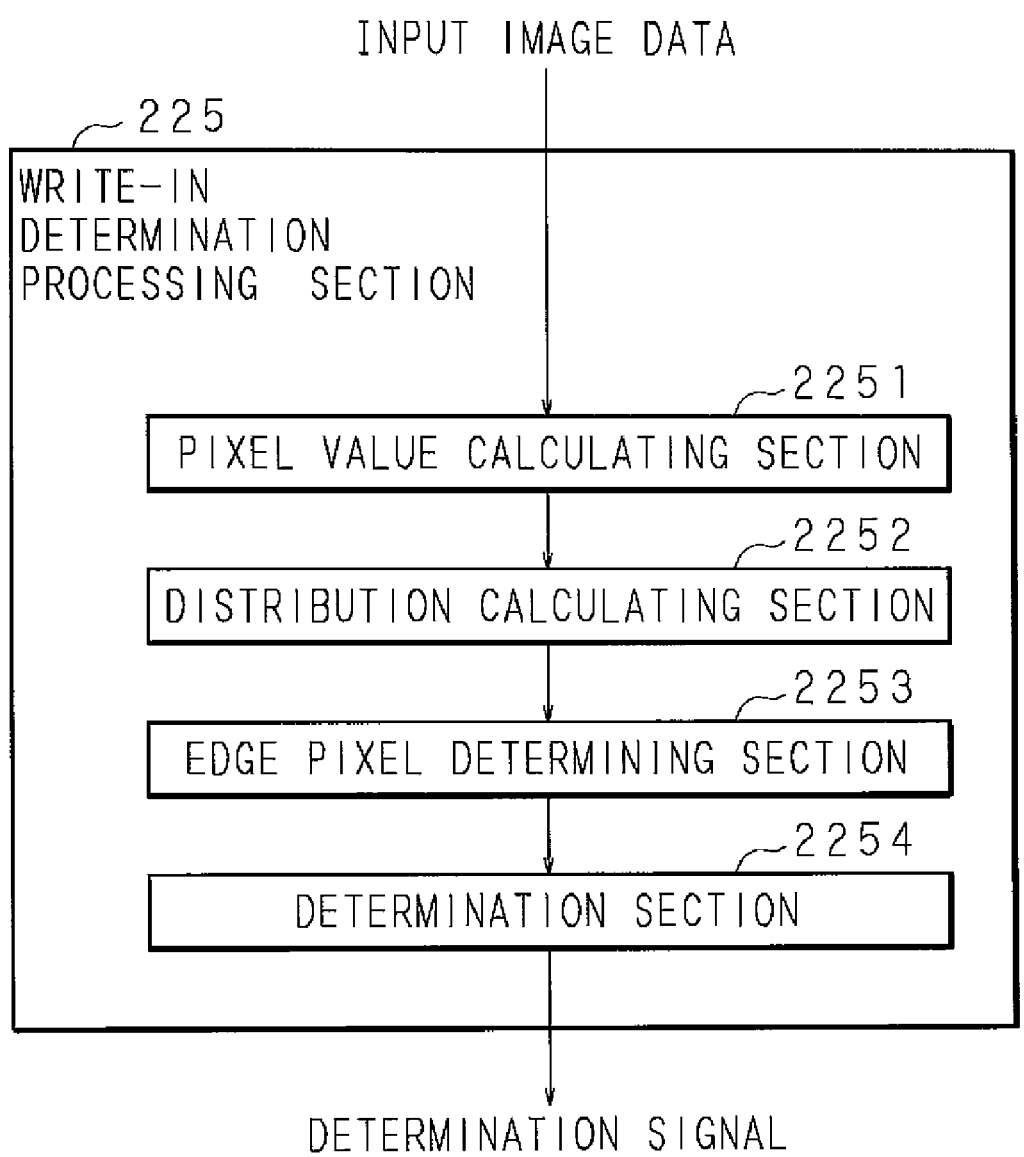
FIG. 26 is a block diagram showing a configuration of a write-in determination processing section in Embodiment 4.

FIG. 26 is a block diagram showing a configuration of a write-in determination processing section 225 of Embodiment 4. The write-in determination processing section 225 includes a pixel value calculating section 2251, a distribution calculating section 2252, an edge pixel determining section 2253, and a determination section 2254. Processing in the respective sections described here is controlled by the control section 227. Further, data obtained in the respective sections described here is stored in the memory 226. Similarly to Embodiment 1, before performing determination process whether write-in is present in the document image, the write-in determination processing section 225 performs position alignment process of aligning the document image and the reference format. The contents of the processing is similar to that of Embodiment 1, and hence description is omitted.

For each pixel within a pixel block (e.g., a first pixel block composed of 7×7 pixels) composed of a plurality of pixels containing a current pixel in an inputted document image (image data), the pixel value calculating section 2251 calculates the average of the density values of the respective pixels within a pixel block (e.g., a second pixel block composed of 7×7 pixels) composed of a plurality of pixels containing the above-mentioned each pixel, and then adopts the calculated average as the pixel value of the above-mentioned each pixel. As a result, the average of each pixel (49 pixels, in this example) in the first pixel block containing the current pixel is obtained. Here, the pixel value to be calculated is not limited to the average. That is, another quantity may be calculated like the central value of the density values of the respective pixels in the second pixel block.

The distribution calculating section 2252 searches for the average of each pixel within the first pixel block composed of a plurality of pixels containing the current pixel, and then calculates the maximum density difference in the first pixel block. Here, the value to be calculated is not limited to the maximum density difference. That is, the variance or the like may be calculated as long as the distribution of the pixel values in the first pixel block can be recognized. The edge pixel determining section 2253 compares the maximum density difference calculated by the distribution calculating section 2252 with an edge determination threshold value (e.g., 30) defined in advance. Then, when the maximum density difference is greater than the edge determination threshold value, the edge pixel determining section 2253 determines that the current pixel in the first pixel block is an edge pixel, and then adds 1 to the number of edge pixels so as to count the number of edge pixels.

Here, the above-mentioned processing of pixel value calculation, distribution calculation, and edge pixel determination is repeated for all the current pixels in the document image.

For each document image, the determination section 2254 compares the number of edge pixels counted by the edge pixel determining section 2253 with a predetermined first determination threshold value (for example, 5000). Then, when the number of edge pixels is greater than the first determination threshold value, the presence of write-in in the document image is estimated. In contrast, when the number of edge pixels is smaller than the first determination threshold value, the absence of write-in in the document image is estimated. In a case that the document image is a color document, the write-in determination processing section 225 may perform the above-mentioned processing for each plane (each color component) of RGB. Further, in a case that the current pixel is determined as being an edge pixel when the maximum density difference of any color component among a plurality of color components is greater than the edge determination threshold value, page background removal need not be performed. Here, the above-mentioned processing may be performed only on a part of the color components. In this case, the processing work load is reduced.

Figure 27:
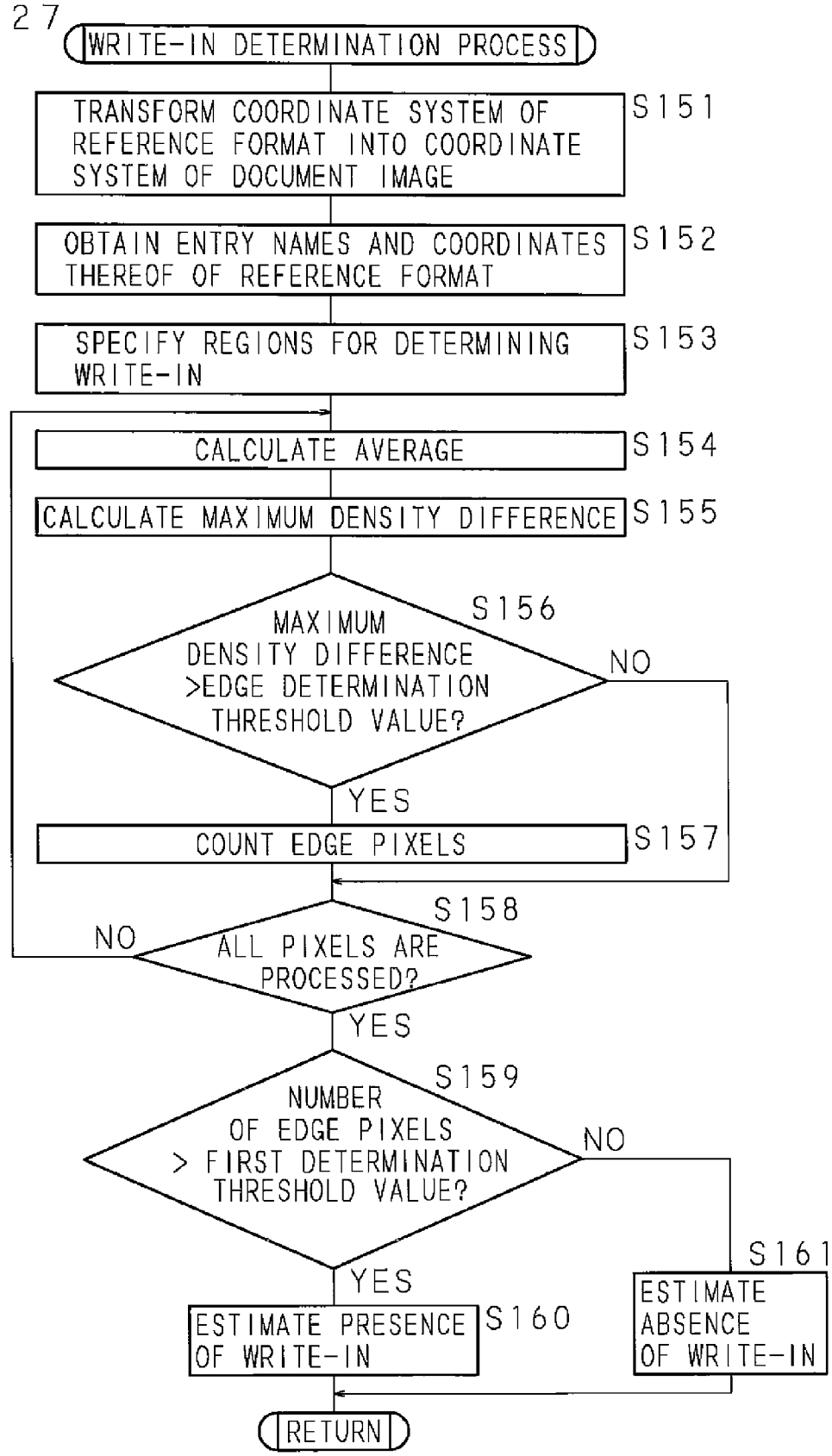
FIG. 27 is a flow chart showing a procedure of write-in determination process in Embodiment 4.

FIG. 27 is a flow chart showing a procedure of write-in determination process in Embodiment 4. Similarly to the above-mentioned embodiment, in addition to being performed by a dedicated hardware circuit, the write-in determination process may be performed by a method in which a program code that defines the procedure of write-in determination process is loaded onto a personal computer having a CPU, a RAM, a ROM, and the like and then the program code is executed by the CPU.

The control section 227 transforms the coordinate system (coordinate values) of a reference format determined as being similar to the document image into the coordinate system (coordinate values) of the document image (S151). In this case, coordinate transformation may be performed on the entire reference format. Alternatively, coordinate transformation may be performed only on entry fields determined in advance in the reference format. The control section 227 searches the coordinate transformation target table 2265 to obtain entry names and coordinates of each entry name of reference format determined as being similar to the document image (S152), and then specifies regions for determining presence or absence of write-in on the document image and on the reference format (S153). The control section 227 calculates the average of each pixel within the pixel block (the first pixel block) containing the current pixel (S154), and then searches the calculated average so as to calculate the maximum density difference in the first pixel block (S155).

The control section 227 determines whether the calculated maximum density difference is greater than an edge determination threshold value (e.g., 30) (S156). When the maximum density difference is greater than the edge determination threshold value (YES at S156), the control section 227 determines that the current pixel is an edge pixel, so as to count edge pixels (S157). At this time, the edge pixel counting is performed by adding 1 to the number of edge pixels at each time of determination as being an edge pixel. When the maximum density difference is not greater than the edge determination threshold value (NO at S156), the control section 227 performs the later-described processing of step S158, without counting the number of edge pixels.

The control section 227 determines whether processing for all the pixels in the document image has been completed (S158). When processing for all the pixels is not yet completed (NO at S158), the processing is changed to the next current pixel, and then the processing at and after step S154 is continued. When processing for all the pixels has been completed (YES at S158), that is, when the processing has been completed for all the pixels in the document image, the control section 227 determines whether the number of counted edge pixels is greater than a first determination threshold value (e.g., 5000) (S159).

When the number of edge pixels is greater than the first determination threshold value (YES at S159), the control section 227 estimates the presence of write-in in the document image (S160), and then terminates the processing. In contrast, when the number of edge pixels is not greater than the first determination threshold value (NO at S159), the control section 227 estimates the absence of write-in in the document image (S161), and then terminates the processing.

According to Embodiment 4, the presence or absence of write-in can be determined only on the basis of the image data of a document image without using the image data of a reference format. Further, the average of the density values within a pixel block (the first pixel block) composed of a plurality of pixels containing the current pixel is calculated for each color component. This suppresses the influence of isolated points and noise at the time of reading and the influence of dirt in the base sheet of the document or dust adhering to the base sheet of the document. Accordingly, determination accuracy for the presence or absence of write-in is improved. Further, since the current pixel is determined as being an edge pixel when the maximum density difference of any one of a plurality of color components is greater than or equal to the threshold value, page background removal need not be performed.

Embodiment 5

In each embodiment described above, the presence or absence of write-in has been determined in a document image. However, the present invention is not limited to determination for a document image, and may be applied to electronic data (data generated by application software) or scanned filing data (data generated by converting data read by a scanner into a predetermined file format such as JPEG and PDF).

For example, data provided in the form of electronic data or scanned filing data may be stored in a server. Then, the present invention in the form of application software may be applied to such data. Preferably, the data described here is stored separately for each electronic data and file format. As for electronic data, several kinds of software can be used. Thus, for example, using a RIP (raster image processor), PDL (Page Description Language) may be interpreted and converted into a raster image (RGB data). Then, the method of the present invention may be applied. Further, as for scanned filing data, for example, in the case of an encoded image format such as JPEG and GIF, the method of the present invention may be applied, after decoding is once performed and then color conversion processing of converting YCC signals into RGB signals is performed when necessary.

As for a PDF format, when the image data is saved in an encoded image format such as JPEG, the method of the present invention may be applied after decoding and conversion into RGB signals are performed. As for a vector data part such as a font, the method of the present invention may be applied after conversion into image data of RGB is performed by a RIP or the like. In the case of a PDF format, information concerning each object (such as a text, a diagram, and a photograph) is stored as a tag. Thus, the data conversion can be performed with reference to this information. For example, in the case of a text, the information concerning an object includes the font, the point size, the color, and the display position. In the case of a photograph, the information includes the coding method, the size, and the display position.

Figure 28:
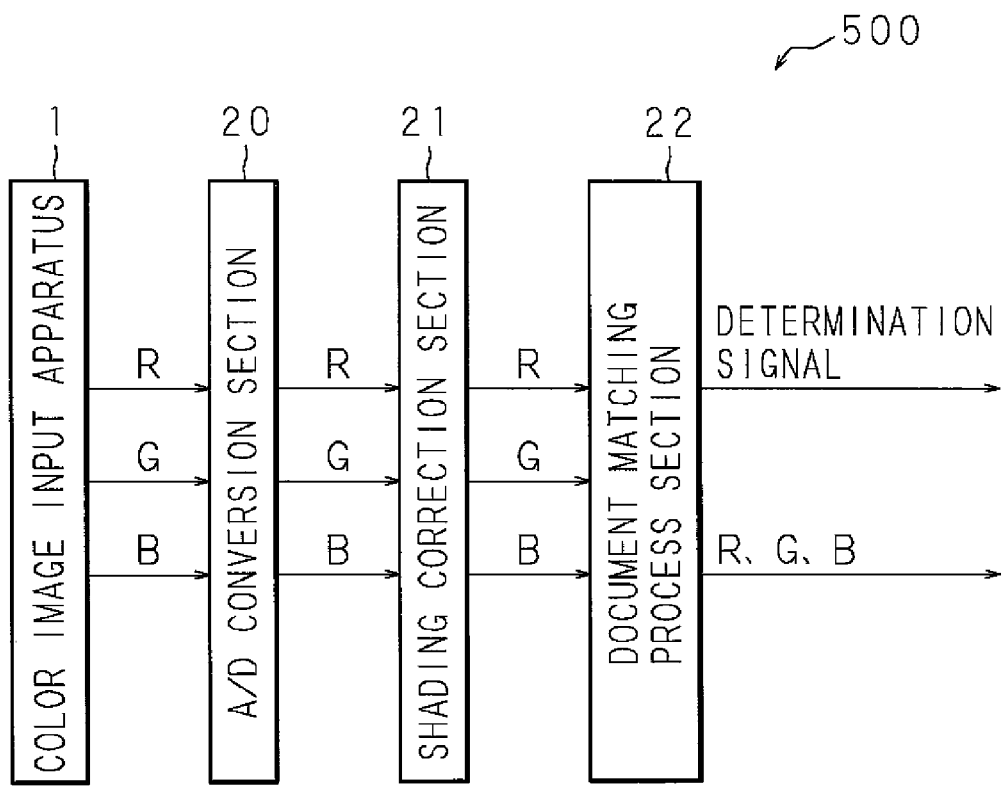
FIG. 28 is a block diagram showing a configuration of an image reading apparatus according to the present invention.

FIG. 28 is a block diagram showing the configuration of an image reading apparatus 500 according to the present invention. As shown in the figure, the image reading apparatus 500 includes a color image input apparatus 1, an A/D conversion section 20, a shading correction section 21, and a document matching process section 22. The color image input apparatus 1, the A/D conversion section 20, the shading correction section 21, and the document matching process section 22 are similar to those of the above-mentioned image forming apparatus 100, and hence description is omitted.

As described above, according to the present invention, permission or non-permission for processing such as copying is determined more accurately than in the prior art. Further, this prevents unauthorized copying or leakage of the written important matter, personal information, confidential information, and the like. Furthermore, unauthorized copying or leakage of confidential information and the like can be prevented in a more detailed manner. Further, a document that has the same format as a document in which write-in is present already and that is without write-in is easily obtained. In particular, when a large number of mutually different format sheets (formats) are stored, a necessary format can easily be selected out. This improves users' convenience. Further, when the important matter, personal information, confidential information, and the like written in the document leak out, the information can easily be tracked and matched.

In the above-mentioned embodiment, the reference formats and the hash table 2262 have been stored in the memory 226 in advance. However, the present invention is not limited to this. That is, the reference formats may be stored in a storage section of a server device connected to the image forming apparatus 100 through a communication line (network), while the hash table 2262 may be stored in the memory 226 in a distributed manner.

In the above-mentioned embodiment, the color image input apparatus 1 may be implemented by, for example, a flat-bed scanner, a film scanner, a digital camera, or a portable telephone. Further, the color image output apparatus 3 may be implemented by, for example: an image display device such as a CRT display and a liquid crystal display; or a printer employing an electrophotography method or an inkjet method that outputs the processing result onto a recording paper sheet or the like. Furthermore, as the image forming apparatus 100, a modem may be provided that serves as communication means for connecting with a server apparatus or the like via a network. Further, in place of obtaining color image data from the color image input apparatus 1, the color image data may be obtained from an external storage device, a server device, or the like via a network.

In the above-mentioned embodiment, the memory 226 and the control section 227 have been provided in the inside of the document matching process section 22. However, the present invention is not limited to this. That is, the memory 226 and the control section 227 may be provided in the outside of the document matching process section 22.

In the present invention, a program code for performing output control process such as document matching process, copying, electronic distribution, and filing may be recorded on a computer-readable memory product for storing a program code (executable program, intermediate code program, and source program) to be executed by a computer. As a result, a memory product that stores a program code for performing the above-mentioned process is provided in a freely portable manner. In order that that processing can be performed by a microcomputer, the memory product may be a program medium such as a memory (not shown) like a ROM. Alternatively, a program media of another type may be employed in which a program reading device serving as an external storage device (not shown) is provided, and a memory product is inserted into there so that the memory product is read.

In each case, the stored program code may be accessed and executed directly by a microprocessor. Alternatively, the program code may be read, then the read program code may be downloaded into a program storage area (not shown) in a microcomputer, and then the program code may be executed. In this case, a computer program for download is stored in the main device in advance.

Here, the above-mentioned program medium is a memory product separable from the main body, and may be: a tape system such as a magnetic tape and a cassette tape; a disk system such as a magnetic disk (including a flexible disk and a hard disk) and an optical disk such as CD-ROM/MO/MD/DVD; a card system such as an IC card (including a memory card) and an optical card; and a medium that carries a program code in a fixed manner, including a semiconductor memory such as a mask ROM, an EPROM (Erasable Programmable Read Only Memory), an EEPROM (Electrically Erasable Programmable Read Only Memory), and a flash ROM.

Further, in this case, since the employed system configuration permits connection to a communication network including the Internet, the memory product may carry the computer program dynamically for example, by means of downloading the program code from a communication network. Here, when the program code is to be downloaded from a communication network, a program for download may be stored in the main device in advance, or alternatively may be installed from another memory product. Here, the present invention may be implemented in the form of a computer data signal in which the above-mentioned program code is embedded in a carrier wave embodied by electronic transmission.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus for determining presence or absence of write-in in an obtained document image, comprising:
   a first determination section which determines whether the obtained document image is similar to a preliminary reference image;
   a second determination section which, when said first determination section determines that the obtained document image is similar to the reference image, determines whether write-in is present in the obtained document image;
   a control section which, in accordance with the determination result of the second determination section, controls output processing for the obtained document image or the reference image;
   a pixel value calculating section which calculates a pixel value of each pixel in a first pixel block containing a current pixel in the obtained document image, on the basis of a pixel value of each pixel in a second pixel block containing the current pixel; and
   an edge determining section which determines whether the current pixel is an edge pixel on the basis of distribution of the pixel values of the respective pixels in the first pixel block calculated by said pixel value calculating section, wherein
   said second determination section determines whether write-in is present in the obtained document image on the basis of the number of edge pixels determined by said edge determining section.

2. The image processing apparatus according to claim 1, wherein
   when the obtained document image is a color image, both said pixel value calculating section and said edge determining section perform processing separately for each color component.

3. An image forming apparatus, comprising:
   an image processing apparatus according to claim 1; and
   an image forming device which forms an output image on the basis of the image processed by said image processing apparatus.

4. An image processing apparatus according to claim 1, wherein when said second determination section determines that write-in is present, said control section inhibits output of the obtained document image.

5. An image processing apparatus according to claim 1, wherein
   when said second determination section determines that write-in is present, said control section inhibits output of the write-in in the part in the obtained document image corresponding to the defined part in the reference image similar to the obtained document image.

6. The image processing apparatus according to claim 1, wherein
   when said second determination section determines that write-in is present, said control section permits output of the reference image determined as being similar to the obtained document image.

7. The image processing apparatus according to claim 1, further comprising
   a recording section which, when said second determination section determines that write in is present, records the obtained document image or a part where write-in is present.

8. The image processing apparatus according to claim 1, wherein
   when said second determination section determines that write-in is absent, said control section permits output of the obtained document image.

9. The image processing apparatus according to claim 1, further comprising
   a page background removing section which removes page background in the obtained document image, wherein
   said second determination section determines whether write-in is present on the basis of the obtained document image in which page background has been removed by said page background removing section.

10. A non-transitory computer-readable memory product which stores a computer program for causing a computer to determine presence or absence of write-in in an obtained document image, wherein the computer program comprises steps of:

causing the computer to determine whether the obtained document image is similar to a preliminary reference image;

causing the computer to determine whether write-in is present in the obtained document image having been determined as being similar;

calculating it pixel value of each pixel in a first pixel block containing a current pixel in the obtained document image, on the basis of a pixel value of each pixel in a second pixel block containing the current pixel;

determining whether the current pixel is an edge pixel on the basis of distribution of the pixel values of the respective pixels in the first pixel block; and determining whether write-in is present in the obtained document image on the basis of the number of edge pixels.

* * * * *